US012008941B2

(12) United States Patent
Jeong et al.

(10) Patent No.: US 12,008,941 B2
(45) Date of Patent: Jun. 11, 2024

(54) DISPLAY DEVICE AND METHOD OF DRIVING THE SAME

(71) Applicant: Samsung Display Co., Ltd., Yongin-si (KR)

(72) Inventors: Geun Young Jeong, Yongin-si (KR); Weon Jun Choe, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/687,701

(22) Filed: Mar. 7, 2022

(65) Prior Publication Data

US 2022/0189376 A1 Jun. 16, 2022

Related U.S. Application Data

(63) Continuation of application No. 16/836,645, filed on Mar. 31, 2020, now Pat. No. 11,270,619.

(30) Foreign Application Priority Data

May 13, 2019 (KR) ........................ 10-2019-0055802

(51) Int. Cl.
*G09G 3/20* (2006.01)

(52) U.S. Cl.
CPC ......... *G09G 3/2003* (2013.01); *G09G 3/2007* (2013.01); *G09G 2300/0452* (2013.01); *G09G 2320/0242* (2013.01)

(58) Field of Classification Search
CPC ... G09G 2300/0452; G09G 2320/0242; G09G 3/2003; G09G 3/2007
See application file for complete search history.

(56) References Cited

U.S. PATENT DOCUMENTS 9,142,180 B2 9/2015 Yang et al.
9,269,329 B2 2/2016 Jeong et al.
(Continued)

FOREIGN PATENT DOCUMENTS

CN 105321448 A 2/2016
CN 107871766 A 4/2018
(Continued)

OTHER PUBLICATIONS

Non-Final Office Action dated Dec. 23, 2020, in U.S. Appl. No. 16/836,645.

(Continued)

*Primary Examiner* — Kenneth Bukowski
(74) *Attorney, Agent, or Firm* — CANTOR COLBURN LLP

(57) ABSTRACT

A display device including a first dot including a first shared pixel and a first dedicated pixel, a second dot disposed closest to the first dot in a first direction and including a second shared pixel and a second dedicated pixel, a third dot disposed in the first direction from the second dot and including a third shared pixel and a third dedicated pixel, and a first dummy dot disposed closest to the third dot in the first direction and including a first dummy pixel, in which the first shared pixel and the second shared pixel are configured to emit light having different colors, the first dedicated pixel, the second dedicated pixel, and the third dedicated pixel are configured to emit light having the same color, and the third shared pixel and the first dummy pixel are configured to emit light having different colors.

19 Claims, 19 Drawing Sheets

(56) References Cited

U.S. PATENT DOCUMENTS

| | | | | |
|---|---|---|---|---|
| 9,472,600 | B2 | 10/2016 | Lin et al. | |
| 9,613,557 | B2 | 4/2017 | Lee et al. | |
| 9,728,116 | B2 | 8/2017 | Park et al. | |
| 10,147,351 | B2 | 12/2018 | Yang et al. | |
| 10,403,193 | B2 | 9/2019 | Kim et al. | |
| 10,720,481 | B2 | 7/2020 | Xiao et al. | |
| 2013/0234917 | A1* | 9/2013 | Lee | H10K 59/352 345/82 |
| 2014/0098143 | A1 | 4/2014 | Lee et al. | |
| 2016/0267847 | A1 | 9/2016 | Chen et al. | |
| 2018/0174511 | A1 | 6/2018 | Kim et al. | |
| 2018/0178511 | A1 | 6/2018 | Kashimura | |
| 2019/0237518 | A1* | 8/2019 | Sun | H01L 27/3218 |
| 2019/0252469 | A1 | 8/2019 | Xiao et al. | |

FOREIGN PATENT DOCUMENTS

| | | | |
|---|---|---|---|
| CN | 208077981 | U | 11/2018 |
| CN | 110137206 | A | 8/2019 |
| KR | 1020140044568 | A | 4/2014 |
| KR | 1020150142626 | A | 12/2015 |

OTHER PUBLICATIONS

Final Office Action dated May 14, 2021, in U.S. Appl. No. 16/836,645.

Notice of Allowance dated Nov. 1, 2021, in U.S. Appl. No. 16/836,645.

* cited by examiner

DISPLAY DEVICE AND METHOD OF DRIVING THE SAME

CROSS REFERENCE TO RELATED APPLICATIONS

This application is a Continuation of U.S. patent application Ser. No. 16/836,645, filed on Mar. 31, 2020, which claims priority from and the benefit of Korean Patent Application No. 10-2019-0055802, filed on May 13, 2019, each of which is hereby incorporated by reference for all purposes as if fully set forth herein.

BACKGROUND

Field

Exemplary embodiments of the invention relate generally to a display device and, more specifically, to a method of driving the display device.

Discussion of the Background

With the development of information technology, the importance of a display device as a connection medium between a user and information has been emphasized. Due to the importance of the display device, the use of various display devices, such as a liquid crystal display (LCD) device, an organic light-emitting display device, and a plasma display device, has increased.

A pixel unit of the display device may include pixels of different colors, and the display device may display an image frame using a combination of light emitted from these pixels.

The pixels of different colors may be arranged in the pixel unit while having predetermined regularities, such as in a pentile or an RGB stripe. However, the regular arrangement of the pixels of different colors may cause a color-tinge phenomenon, whereby a specific color appears at the edges (e.g., boundaries) of the pixel unit.

The above information disclosed in this Background section is only for understanding of the background of the inventive concepts, and, therefore, it may contain information that does not constitute prior art.

SUMMARY

Display devices constructed according to exemplary embodiments of the invention, and a method of driving the display device are capable of preventing a tinge of color from occurring at the edges of a pixel unit.

Additional features of the inventive concepts will be set forth in the description which follows, and in part will be apparent from the description, or may be learned by practice of the inventive concepts.

A display device according to an exemplary embodiment includes a first dot including a first shared pixel and a first dedicated pixel, a second dot disposed closest to the first dot in a first direction and including a second shared pixel and a second dedicated pixel, a third dot disposed in the first direction from the second dot and including a third shared pixel and a third dedicated pixel, and a first dummy dot disposed closest to the third dot in the first direction and including a first dummy pixel, in which the first shared pixel and the second shared pixel are configured to emit light having different colors, the first dedicated pixel, the second dedicated pixel, and the third dedicated pixel are configured to emit light having the same color, and the third shared pixel and the first dummy pixel are configured to emit light having different colors.

The first dummy pixel may be an outermost pixel in the first direction with respect to the first dot.

The display device may further include a fourth dot disposed in a second direction from the first dot and including a fourth shared pixel and a fourth dedicated pixel, a fifth dot disposed in the first direction from the fourth dot and in the second direction from the third dot, the fifth dot including a fifth shared pixel and a fifth dedicated pixel, and a second dummy dot disposed closest to the fifth dot in the first direction and in the second direction from the first dummy dot, the second dummy dot including a second dummy pixel, in which the fifth shared pixel and the second dummy pixel may be configured to emit light having different colors.

The second dummy pixel may be an outermost pixel in the first direction with respect to the fourth dot.

The second dummy pixel may be an outermost pixel in the second direction with respect to the first dummy dot, and the fourth dedicated pixel may be an outermost pixel in the second direction with respect to the first dot.

A light-emitting area of the first shared pixel may be smaller than a light-emitting area of the second shared pixel, and a light-emitting area of the first dummy pixel may be smaller than a light-emitting area of the third shared pixel.

The display device may further include a third dummy dot disposed closest to the fourth dot in the second direction and including a third dummy pixel, in which the fourth shared pixel and the third dummy pixel may be configured to emit light having different colors.

The display device may further include a fourth dummy dot disposed in the first direction from the third dummy dot and closest to the fifth dot in the second direction, the fourth dummy dot including a fourth dummy pixel, in which the fifth shared pixel and the fourth dummy pixel may be configured to emit light having different colors.

The display device may further include a fifth dummy dot disposed closest to the fourth dummy dot in the first direction and closest to the second dummy dot in the second direction, the fifth dummy dot including a fifth dummy pixel, in which the fourth dummy pixel and the second dummy pixel may be configured to emit light having the same color, and the fourth dummy pixel and the fifth dummy pixel may be configured to emit light having different colors.

The third dummy pixel may be an outermost pixel in the second direction with respect to the first dot, the fourth dummy pixel may be an outermost pixel in the second direction with respect to the third dot, and the fifth dummy pixel may be an outermost pixel in the second direction with respect to the first dummy dot, and is an outermost pixel in the first direction with respect to the third dummy dot.

A light-emitting area of the fifth shared pixel may be larger than a light-emitting area of the second dummy pixel, and a light-emitting area of the second dummy pixel may be larger than a light-emitting area of the fifth dummy pixel.

An image frame may include input gray scale values of the first dot, the second dot, and the third dot, respectively, and the image frame may not include input grayscale values of the first dummy dot.

The display device may further include a renderer configured to generate an output grayscale value of the second shared pixel using input grayscale values of the same color in the first dot and the second dot, in which the renderer may be further configured to generate an output grayscale value of the first dummy pixel using the input grayscale value of the third dot.

A proportion of the input grayscale value of the third dot applied to the output grayscale value of the first dummy pixel may be equal to a proportion of the input grayscale value of the first dot applied to the output grayscale value of the second shared pixel.

A proportion of the input grayscale value of the third dot applied to the output grayscale value of the first dummy pixel may be greater than a proportion of the input grayscale value of the first dot applied to the output grayscale value of the second shared pixel.

A method of driving a display device according to another exemplary embodiment includes the steps of: receiving respective input grayscale values of a first dot, a second dot disposed closest to the first dot in a first direction, and a third dot disposed in the first direction from the second dot; generating an output gray scale value of a second shared pixel included in the second dot using input grayscale values of an identical color in the first dot and the second dot; and generating an output grayscale value of a first dummy pixel disposed closest to the third dot in the first direction using the input grayscale value of the third dot, in which the first dummy pixel is an outermost pixel in the first direction with respect to the first dot.

A proportion of the input grayscale value of the third dot applied to the output grayscale value of the first dummy pixel may be equal to a proportion of the input grayscale value of the first dot applied to the output grayscale value of the second shared pixel.

A proportion of the input grayscale value of the third dot applied to the output grayscale value of the first dummy pixel may be greater than a proportion of the input grayscale value of the first dot applied to the output grayscale value of the second shared pixel.

The first dot may include a first shared pixel and a first dedicated pixel, the second dot may further include a second dedicated pixel, the third dot may include a third shared pixel and a third dedicated pixel, the first shared pixel and the second shared pixel may be configured to emit light having different colors, the first dedicated pixel, the second dedicated pixel, and the third dedicated pixel may be configured to emit light having the same color, and the third shared pixel and the first dummy pixel may be configured to emit light having different colors.

The first shared pixel may be configured to emit light having a first color, the first dedicated pixel, the second dedicated pixel, and the third dedicated pixel may be configured to emit light having a second color, the second shared pixel may be configured to emit light having a third color, the third shared pixel may be configured to emit light having one of the first color and the third color, and the first dummy pixel may be configured to emit light having the remaining one of the first color and the third color.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
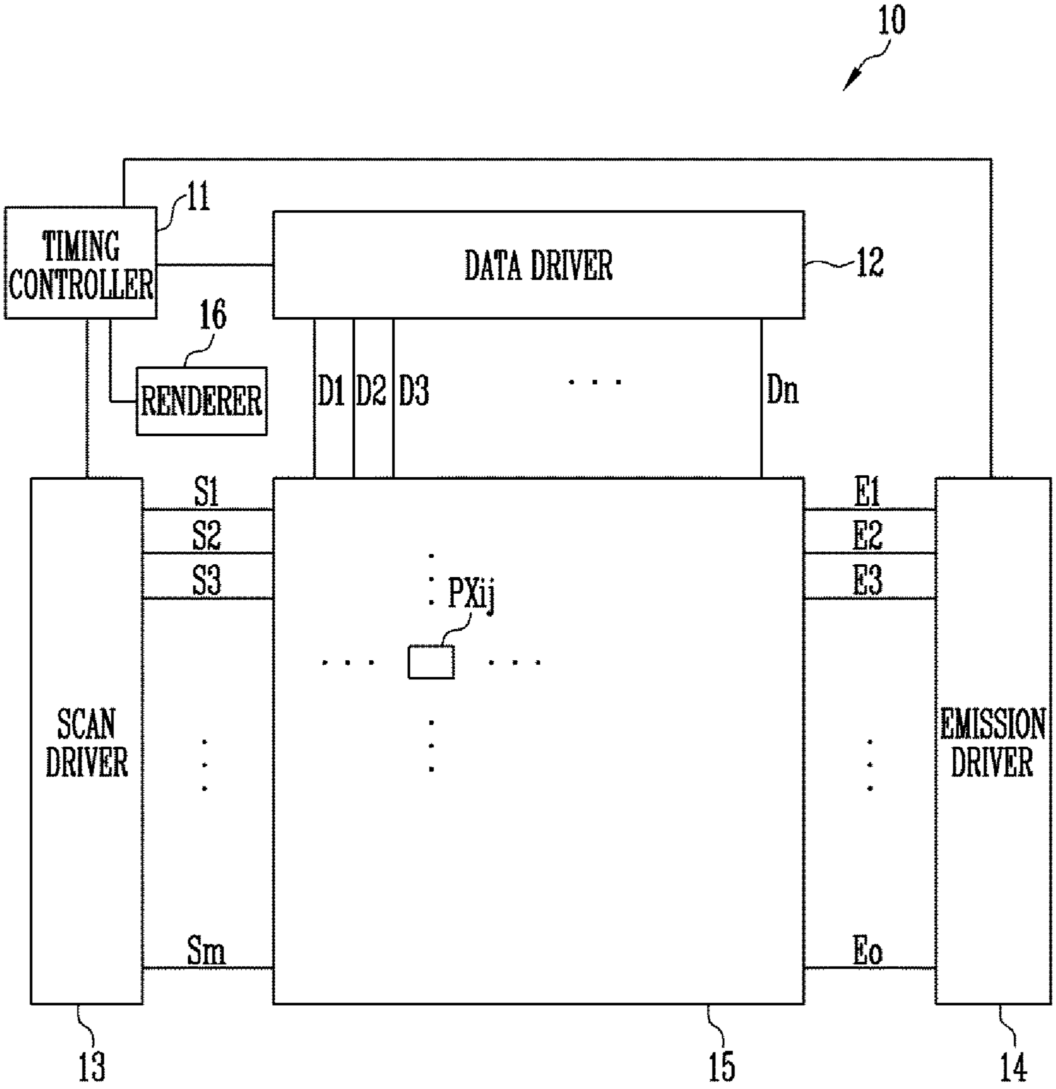
FIG. 1 is a schematic diagram of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic diagram of a display device according to an exemplary embodiment.

Referring to FIG. 1, a display device 10 according to an exemplary embodiment may include a timing controller 11, a data driver 12, a scan driver 13, an emission driver 14, a pixel unit 15, and a renderer 16.

The timing controller 11 may receive input grayscale values and control signals for an image frame from an external processor. The renderer 16 may render the input grayscale values to conform to the specifications of the display device 10.

For example, the image frame may include input grayscale values of respective dots (e.g., an input grayscale value of a first color, an input grayscale value of a second color, and an input grayscale value of a third color). For example, the first color may be red, the second color may be green, and the third color may be blue. The image frame may not include input grayscale values of dummy dots, which will be described in more detail later.

According to an exemplary embodiment, each dot of the pixel unit 15 may include some of a pixel of the first color, a pixel of a second color, and a pixel of a third color. For example, a first dot may include only a pixel of a first color and a pixel of a second color, and a second dot adjacent to the first dot may include only a pixel of a second color and a pixel of a third color. In this case, instead of the first dot, the pixel of the third color in the second dot may display an input grayscale value of the third color in the first dot. That is, the pixel of the third color in the second dot may be shared between the second dot and the first dot. Also, instead of the second dot, a pixel of a first color in the first dot may display an input grayscale value of the first color in the second dot. That is, the pixel of the first color in the first dot may be shared between the first dot and the second dot. As such, a pixel of a first color (also referred to as a “first color pixel”) and a pixel of a third color (also referred to as a “third color pixel”) may be designated as shared pixels. Also, a pixel of a second color (also referred to as a “second color pixel”) may be referred to as a “dedicated pixel”. Since the first dot and the second dot each requires a second color pixel, the support from an adjacent dot may not be needed upon displaying a second color.

A procedure for rearranging the input grayscale values, as described above, may be referred to as “rendering”. The renderer 16 may generate output grayscale values by rendering the input gray scale values. The timing controller 11 may provide the data driver 12, the scan driver 13, the emission driver 14, etc. with control signals suitable for respective specifications thereof to display an image frame.

The data driver 12 may generate data voltages to be provided to data lines D1, D2, D3, . . . , Dn using the output grayscale values and the control signals. For example, the data driver 12 may sample the output grayscale values using a clock signal, and may apply the data voltages corresponding to the output grayscale values to the data lines D1 to Dn for each pixel row (e.g. pixels connected to the same scan line). Here, n may be an integer greater than 0.

The scan driver 13 may receive a clock signal, a scan start signal, etc. from the timing controller 11, and may then generate scan signals to be provided to scan lines S1, S2, S3, . . . , Sm. Here, m may be an integer greater than 0.

The scan driver 13 may sequentially provide scan signals, each having a turn-on level pulse, to the scan lines S1, S2, S3, . . . , Sm. The scan driver 13 may include scan stage circuits configured in the form of a shift register. The scan driver 13 may generate scan signals in a manner in which a scan start signal having the form of a turn-on level pulse is sequentially transferred to a next scan stage circuit, under the control of the clock signal.

The emission driver 14 may receive a clock signal, an emission stop signal, etc. from the timing controller 11, and may then generate emission signals to be provided to emission lines E1, E2, E3, . . . , Eo. For example, the emission driver 14 may sequentially provide emission signals, each having a turn-off level pulse, to the emission lines E1 to Eo. According to an exemplary embodiment, each emission stage circuit of the emission driver 14 may be configured in the form of a shift register, and may generate the emission signals in a manner, in which an emission stop signal having the form of a turn-off level pulse is sequentially transferred to a next emission stage circuit under the control of the clock signal. Here, “o” may be an integer greater than 0.

The pixel unit 15 may include pixels. Each pixel PXij may be coupled to a data line, a scan line, and an emission line that correspond to the pixel PXij. Also, the pixels PXij may be coupled to a first power line and a second power line. Here, “i” and “j” may be integers greater than 0. Each pixel PXij may refer to a pixel, in which a scan transistor is coupled to an $i^{th}$ scan line and a $j^{th}$ data line.

Figure 2:
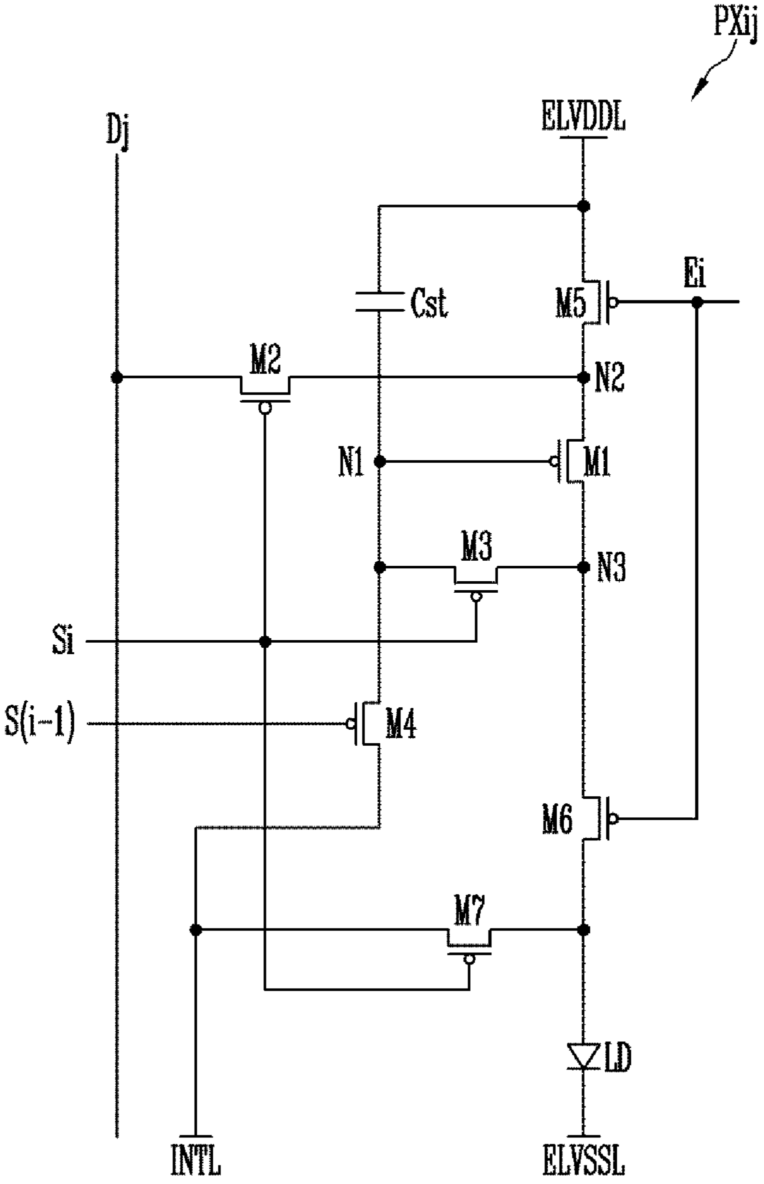
FIG. 2 is a schematic circuit diagram of a pixel according to an exemplary embodiment.

FIG. 2 is a schematic circuit diagram of a pixel according to an exemplary embodiment.

Referring to FIG. 2, a pixel PXij may include transistors M1, M2, M3, M4, M5, M6, and M7, a storage capacitor Cst, and a light-emitting diode LD.

Hereinafter, a circuit configured using P-type transistors will be described as an example. However, the inventive concepts are not limited thereto, and in some exemplary embodiments, a circuit may be configured using N-type transistors by varying the polarity of a voltage applied to a gate electrode of each transistor, or configured using a combination of P-type transistors and N-type transistors. The term “P-type transistor” commonly designates a transistor, through which an increased amount of current flows as a voltage difference between a gate electrode and a source electrode increases in a negative direction. The term “N-type transistor” commonly designates a transistor, through which an increased amount of current flows as a voltage difference between a gate electrode and a source electrode increases in a positive direction. Each transistor may be implemented as any of various types of transistors, such as a thin-film transistor (TFT), a field effect transistor (FET), and a bipolar junction transistor (BJT).

A transistor M1 has a gate electrode coupled to a first node N1, a first electrode coupled to a second node N2, and a second electrode coupled to a third node N3. The transistor M1 may be designated as a driving transistor.

A transistor M2 has a gate electrode coupled to an $i^{th}$ scan line Si, a first electrode coupled to a data line Dj, and a second electrode coupled to the second node N2. The transistor M2 may be designated as a scan transistor.

A transistor M3 has a gate electrode coupled to the $i^{th}$ scan line Si, a first electrode coupled to the first node N1, and a second electrode coupled to the third node N3. The transistor M3 may be designated as a diode-connection transistor.

A transistor M4 has a gate electrode coupled to an $i-1^{th}$ scan line S(i−1), a first electrode coupled to the first node N1, and a second electrode coupled to an initialization line INTL. In some exemplary embodiments, the gate electrode of the transistor M4 may be coupled to another scan line. The transistor M4 may be designated as a gate initialization transistor.

A transistor M5 has a gate electrode coupled to an $i^{th}$ emission line Ei, a first electrode coupled to a first power line ELVDDL, and a second electrode coupled to the second node N2. The transistor M5 may be designated as a light-emitting transistor. In some exemplary embodiments, the gate electrode of the transistor M5 may be coupled to another emission line.

A transistor M6 has a gate electrode coupled to the $i^{th}$ emission line Ei, a first electrode coupled to the third node N3, and a second electrode coupled to an anode of the light-emitting diode LD. The transistor M6 may be designated as a light-emitting transistor. In some exemplary embodiments, the gate electrode of the transistor M6 may be coupled to another emission line.

A transistor M7 has a gate electrode coupled to the $i^{th}$ scan line Si, a first electrode coupled to the initialization line INTL, and a second electrode coupled to the anode of the light-emitting diode LD. The transistor M7 may be designated as an anode-initialization transistor. In some exemplary embodiments, the gate electrode of the transistor M7 may be coupled to another scan line.

A first electrode of the storage capacitor Cst may be coupled to the first power line ELVDDL, and a second electrode thereof may be coupled to the first node N1.

The light-emitting diode LD may have the anode coupled to the second electrode of the transistor M6 and a cathode coupled to the second power line ELVSSL. The light-emitting diode LD may be implemented as an organic light-emitting diode, an inorganic light-emitting diode, a quantum dot light-emitting diode, or the like.

A first supply voltage may be applied to the first power line ELVDDL, a second supply voltage may be applied to the second power line ELVSSL, and an initialization voltage may be applied to the initialization line INTL.

Figure 3:
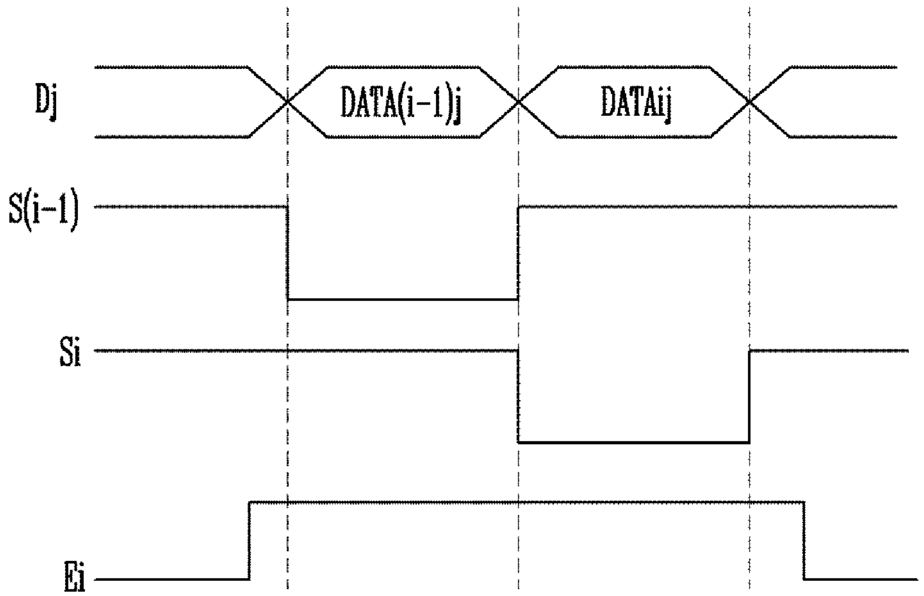
FIG. 3 is a diagram exemplarily illustrating a method of driving the pixel of FIG. 2.

FIG. 3 is a diagram exemplary illustrating a method of driving the pixel of FIG. 2.

First, a data voltage DATA(i−1)j for an $i-1^{th}$ pixel may be applied to a data line Dj, and a scan signal having a turn-on level (e.g., a low level) may be applied to the scan line S(i−1).

Here, since a scan signal having a turn-off level (e.g., a high level) is applied to the $i^{th}$ scan line Si, the transistor M2 is in a turn-off state, and thus, the data voltage DATA(i−1)j for the $i-1^{th}$ pixel is prevented from flowing into the pixel PXij.

When the transistor M4 is turned on, the first node N1 may be coupled to the initialization line INTL, and thus, the voltage of the first node N1 may be initialized. Since an emission signal having a turn-off level is applied to the emission line Ei, the transistors M5 and M6 are in a turn-off state, and thus, unnecessary emission of the light-emitting diode LD that may be caused from a process for applying the initialization voltage is prevented.

Next, a data voltage DATAij for the $i^{th}$ pixel PXij is applied to the data line Dj, and a scan signal having a turn-on level is applied to the $i^{th}$ scan line Si. Accordingly, the transistors M2, M1, and M3 are conducted (turned on), and thus, the data line Dj is electrically coupled to the first node N1. As such, a compensation voltage obtained by subtracting the threshold voltage of the transistor M1 from the data voltage DATAij may be applied to the second electrode (e.g., the first node N1) of the storage capacitor Cst, and the storage capacitor Cst maintains a voltage corresponding to the difference between the first supply voltage and the compensation voltage. Such a period may be designated as a threshold voltage compensation period.

In this case, since the transistor M7 is in a turn-on state, the anode of the light-emitting diode LD is coupled to the initialization line INTL, and the light-emitting diode LD is pre-charged or initialized with charges that correspond to the difference between the initialization voltage and the second supply voltage.

Thereafter, as an emission signal having a turn-on level is applied to the emission line Ei, and the transistors M5 and M6 may be conducted (turned on). As such, a driving current path leading from the first power line ELVDDL to the transistor M5, the transistor M1, the transistor M6, the light-emitting diode LD, and the second power line ELVSSL may be formed.

Depending on the voltage maintained in the storage capacitor Cst, the amount of driving current flowing through the first electrode and the second electrode of the transistor M1 may be adjusted. In this manner, the light-emitting diode LD may emit light with luminance corresponding to the amount of driving current. The light-emitting diode LD emits light until an emission signal having a turn-off level is applied to the emission line Ei.

Figure 4:
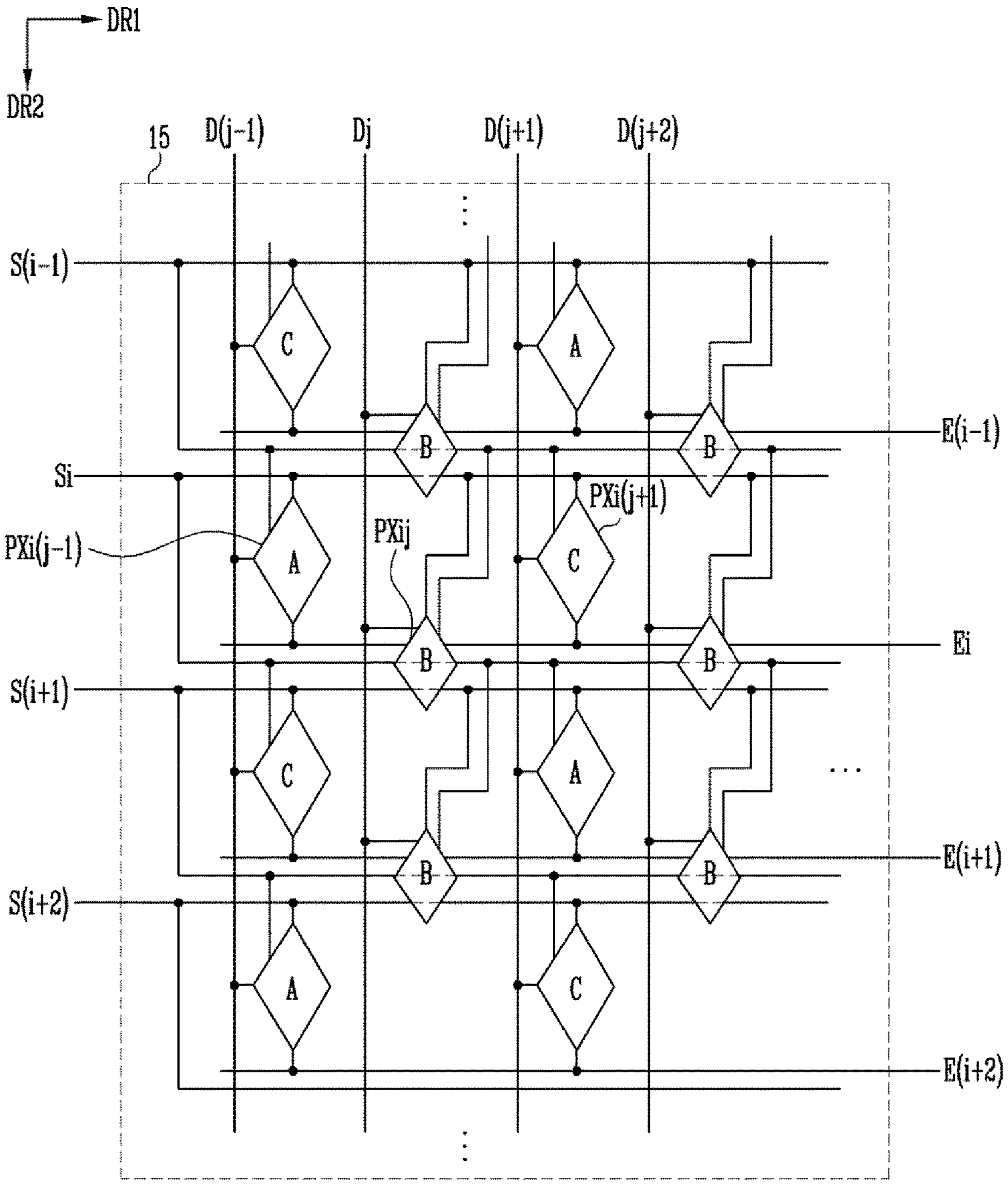
FIG. 4 is a diagram for illustrating an electrical connection between pixels.

FIG. 4 is a diagram illustrating an electrical connection between pixels.

Referring to FIG. 4, a part of the pixel unit 15 is enlarged and illustrated. Pixels A may be first color pixels, pixels B may be second color pixels, and pixels C may be third color pixels.

In FIG. 4, the locations of the pixels A, B, and C are illustrated with respect to respective light-emitting surfaces (e.g., light-emitting (luminescent) materials of light-emitting diodes). As such, the locations of pixel circuits of the pixels A, B, and C may be different from that shown in FIG. 4. More particularly, the locations of pixels, which will be described later with reference to FIG. 4 and subsequent drawings, denote the locations of the light-emitting surfaces of the pixels.

For example, when a scan signal having a turn-on level is applied to an $i^{th}$ scan line Si, a pixel PXi(j−1) may store a data voltage applied to a $j-1^{th}$ data line D(j−1), a pixel PXij may store a data voltage applied to a $j^{th}$ data line Dj, and a pixel PXi(j+1) may store a data voltage applied to a $j+1^{th}$ data line D(j+1).

The pixels coupled to the $i^{th}$ scan line Si may be repetitively disposed in the sequence of pixel A, pixel B, pixel C, and pixel B along a first direction DR1.

Pixels coupled to an $i+1^{th}$ scan line S(i+1), which is closest to the $i^{th}$ scan line Si in a second direction DR2, may be repetitively disposed in the sequence of pixel C, pixel B, pixel A, and pixel B along the first direction DR1. The first direction DR1 and the second direction DR2 may be different directions. For example, the first direction DR1 and the second direction DR2 may be orthogonal to each other.

The first color, the second color, and the third color may be different colors. For example, the first color may be one of red, green, and blue, the second color may be one of red, green, and blue, other than the first color, and the third color may be the remaining one of red, green, and blue, other than the first color and the second color. However, the inventive concepts are not limited thereto, and in some exemplary embodiments, the first to third colors may be magenta, cyan, and yellow, instead of red, green, and blue. Hereinafter, the first color, the second color, and the third color will be exemplarily described as red, green, and blue, respectively.

Although the light-emitting surfaces of the pixels A, B, and C are illustrated as being diamond-shaped in FIG. 4 and subsequent drawings, however, the inventive concepts are not limited thereto. For example, in some exemplary embodiments, the light-emitting surfaces of the pixels A, B, and C may have various shapes, such as a circle, an ellipse, and a hexagon. Further, although the light-emitting areas of the pixels A and C are illustrated as being relatively large and the light-emitting areas of the pixels B are illustrated as being relatively small in the drawings, in some exemplary embodiments, the light-emitting areas of the pixels A, B, and C may be differently configured depending on the efficiency of light-emitting materials.

The structure of the pixel unit 15, such as that illustrated in FIG. 4, may be designated as a pentile structure or a diamond pentile structure.

Figure 5:
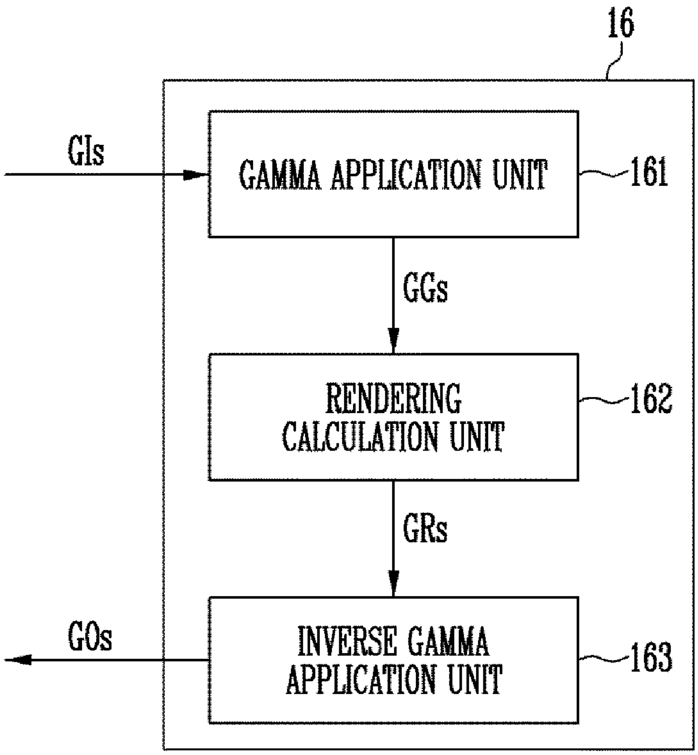
FIG. 5 is a diagram of a renderer according to an exemplary embodiment.
Figure 6:
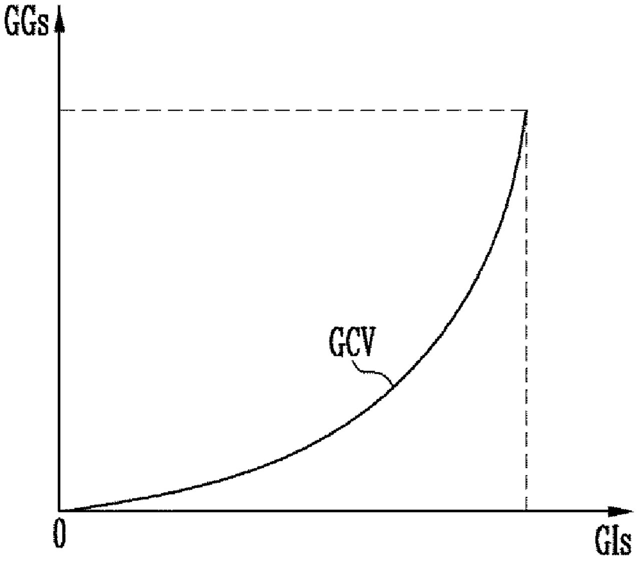
FIG. 6 is a diagram for illustrating a gamma application unit according to an exemplary embodiment.
Figure 7:
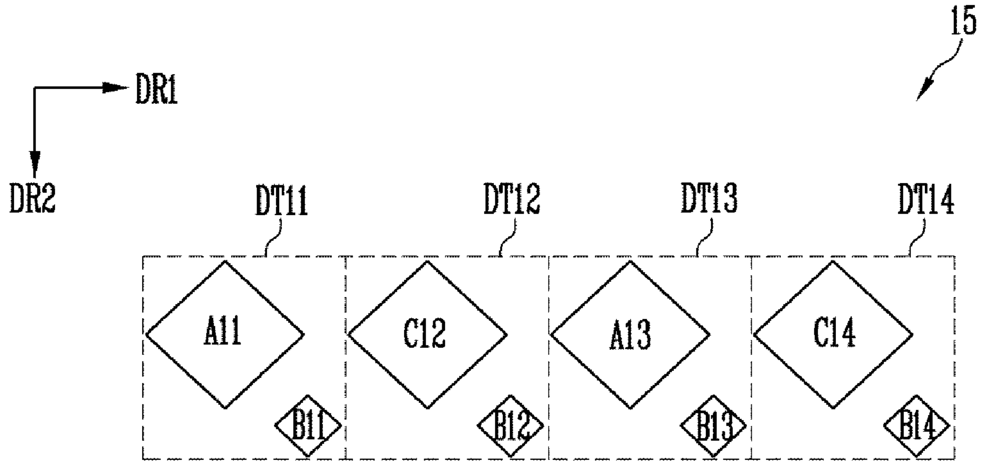
FIG. 7 is a diagram for illustrating a rendering calculation unit according to an exemplary embodiment.
Figure 8:
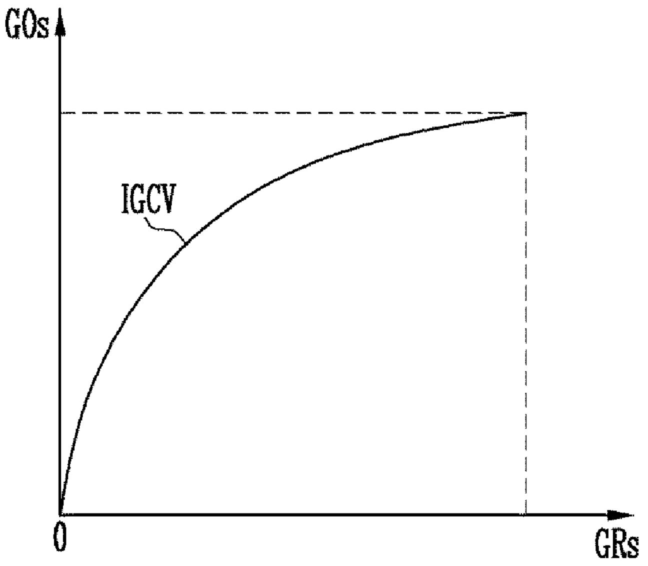
FIG. 8 is a diagram for illustrating an inverse gamma application unit according to an exemplary embodiment.

FIG. 5 is a diagram of a renderer according to an exemplary embodiment, FIG. 6 is a diagram for illustrating a gamma application unit according to an exemplary embodiment, FIG. 7 is a diagram for illustrating a rendering calculation unit according to an exemplary embodiment, and FIG. 8 is a diagram for illustrating an inverse gamma application unit according to an exemplary embodiment.

A renderer 16 according to an exemplary embodiment may include a gamma application unit 161, a rendering calculation unit 162, and an inverse gamma application unit 163.

The gamma application unit 161 may generate gamma grayscale values GGs by applying a gamma curve GCV to input grayscale values GIs.

The gamma value of the gamma curve GCV, for example, a gamma of 2.0, a gamma of 2.2, or a gamma of 2.4, may be different depending on a display device 10. Furthermore, in some exemplary embodiments, a user may set the gamma value of the gamma curve GCV.

Since an image frame displayed to the user reflects the gamma curve GCV, grayscale values need to be rendered based on gamma grayscale values GGs, in which the gamma curve GCV is reflected.

The rendering calculation unit 162 may generate rendered grayscale values GRs by applying a rendering filter to the gamma grayscale values GGs. For example, the rendering filter may be represented by the following Equation (1):

$$RF1=[K1\ K2\ K3] \quad \text{Equation (1)}$$

Here, RF1 may denote a rendering filter, K1 may denote a coefficient to be multiplied by a gamma grayscale value of a left dot (e.g., a dot in a direction opposite to a first direction DR1), K2 may denote a coefficient to be multiplied by a gamma grayscale value of a target dot, and K3 may denote a coefficient to be multiplied by a gamma grayscale value of a right dot (e.g., a dot in the first direction DR1).

A rendering filter to be applied to gamma grayscale values of a first color, and a rendering filter to be applied to gamma grayscale values of a third color may be independent of each other. A rendering filter may not be applied to gamma grayscale values of a second color.

For example, the rendering calculation unit 162 may generate a rendered grayscale value of a shared pixel C12 of a third color by adding a value obtained by multiplying K1 by a gamma grayscale value of the third color in a dot DT11, a value obtained by multiplying K2 by a gamma grayscale value of the third color in a dot DT12, and a value obtained by multiplying K3 by a gamma grayscale value of the third color in a dot DT13.

Similarly, the rendering calculation unit 162 may generate a rendered grayscale value of a shared pixel A13 of a first color by adding a value obtained by multiplying K1 by a gamma grayscale value of the first color in the dot DT12, a value obtained by multiplying K2 by a gamma grayscale value of the first color in the dot DT13, and a value obtained by multiplying K3 by a gamma grayscale value of the first color in a dot DT14.

For example, the rendering calculation unit 162 may generate rendered grayscale values of dedicated pixels B11, B12, B13, and B14, so that they are identical to gamma grayscale values of the second color of the dedicated pixels B11, B12, B13, and B14.

For example, K1 may be 0.25, K2 may be 0.5, and K3 may be 0.25. However, due to a blurring issue, K1 may be set to 0.5, K2 may be set to 0.5, and K3 may be set to 0. As long as K1+K2+K3=1 is satisfied, K1, K2, and K3 may be set to various values.

The inverse gamma application unit 163 may generate output grayscale values GOs by applying an inverse gamma curve IGCV to the input grayscale values GIs.

Since the data driver 12 generates data voltages using the gamma voltages, in which the gamma curve GCV is reflected, the gamma curve GCV should be prevented from being doubly reflected. The inverse gamma value of the inverse gamma curve IGCV may be the reciprocal of the gamma value of the gamma curve GCV.

Figure 9:
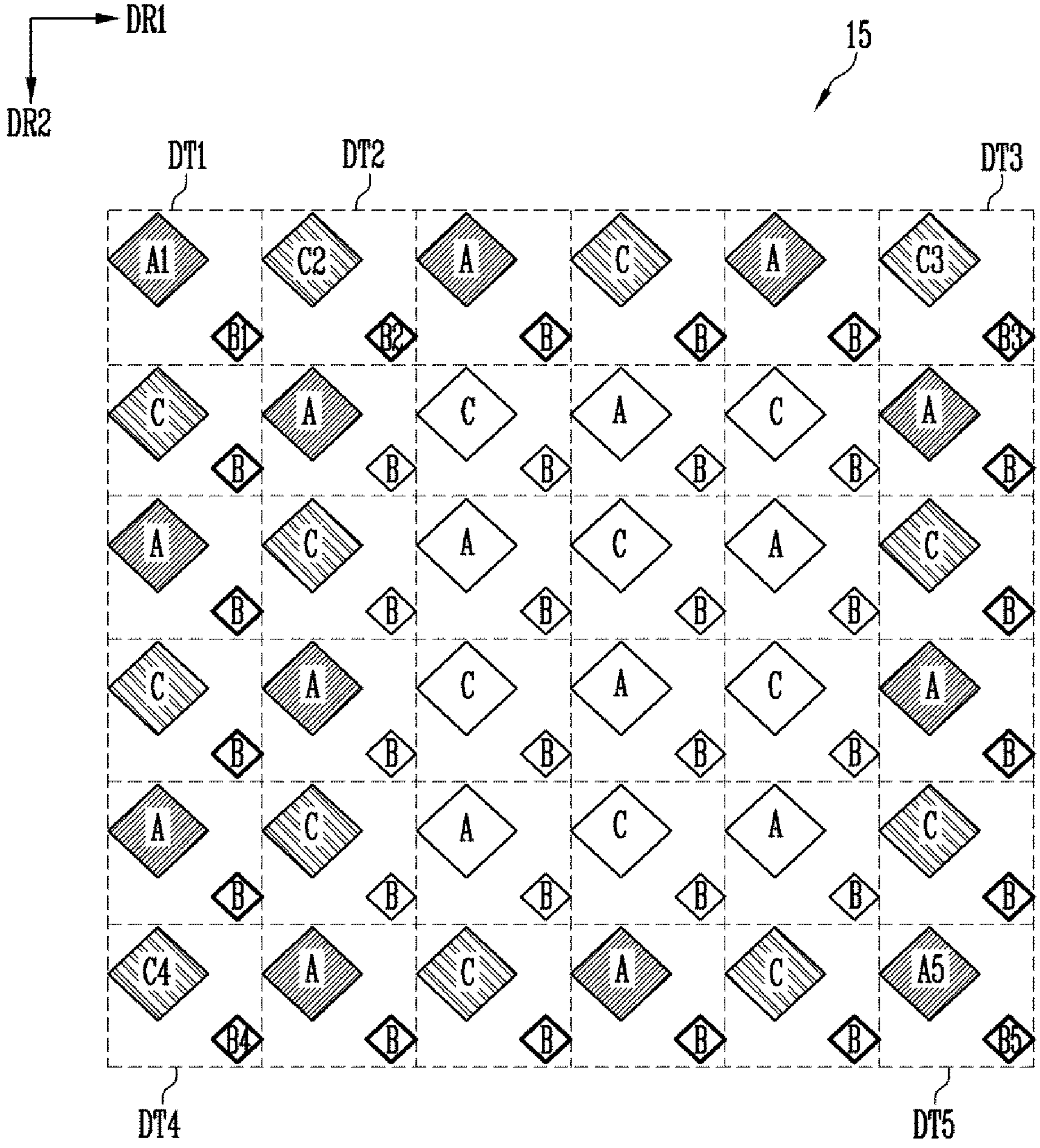
FIG. 9 is a diagram of a pixel unit according to an exemplary embodiment.

FIG. 9 is a diagram of a pixel unit according to an exemplary embodiment.

Referring to FIG. 9, a pixel unit 15 according to an exemplary embodiment may include dots DT1, DT2, DT3, DT4, and DT5. Each of the dots DT1, DT2, DT3, DT4, and DT5 may include one of second color pixels B, B1, B2, B3, B4, and B5, and may further include one of first color pixels A, A1, and A5 and third color pixels C, C2, C3, and C4.

The first dot DT1 may include a first shared pixel A1 and a first dedicated pixel B1. The first dot DT1 may be the outermost dot of the pixel unit 15 in a direction opposite a first direction DR1 with respect to the third dot DT3. The first shared pixel A1 may be the outermost pixel of the pixel unit 15 in the direction opposite the first direction DR1 with respect to the third dot DT3.

The second dot DT2 may be disposed closest to the first dot DT1 in the first direction DR1, and may include a second shared pixel C2 and a second dedicated pixel B2.

The third dot DT3 may be disposed in the first direction DR1 from the second dot DT2, and may include a third shared pixel C3 and a third dedicated pixel B3. The third dot DT3 may be the outermost dot of the pixel unit 15 in the first direction DR1 with respect to the first dot DT1. The third dedicated pixel B3 may be the outermost pixel of the pixel unit 15 in the first direction DR1 with respect to the first dot DT1.

The fourth dot DT4 may be disposed in the second direction DR2 from the first dot DT1, and may include a fourth shared pixel C4 and a fourth dedicated pixel B4. The fourth dot DT4 may be the outermost dot of the pixel unit 15 in the second direction DR2 with respect to the first dot DT1. The fourth dedicated pixel B4 may be the outermost pixel of the pixel unit 15 in the second direction DR2 with respect to the first dot DT1.

The fifth dot DT5 may be disposed in the first direction DR1 from the fourth dot DT4 and disposed in the second direction DR2 from the third dot DT3, and may include a fifth shared pixel A5 and a fifth dedicated pixel B5. The fifth dot DT5 may be the outermost dot of the pixel unit 15 in the second direction DR2 with respect to the third dot DT3. The fifth dedicated pixel B5 may be the outermost pixel of the pixel unit 15 in the second direction DR2 with respect to the third dot DT3.

In FIG. 9, patterns are displayed on pixels, which emit light, based on the assumption that the edges of the pixel unit 15 are indicated in white.

Figure 10:
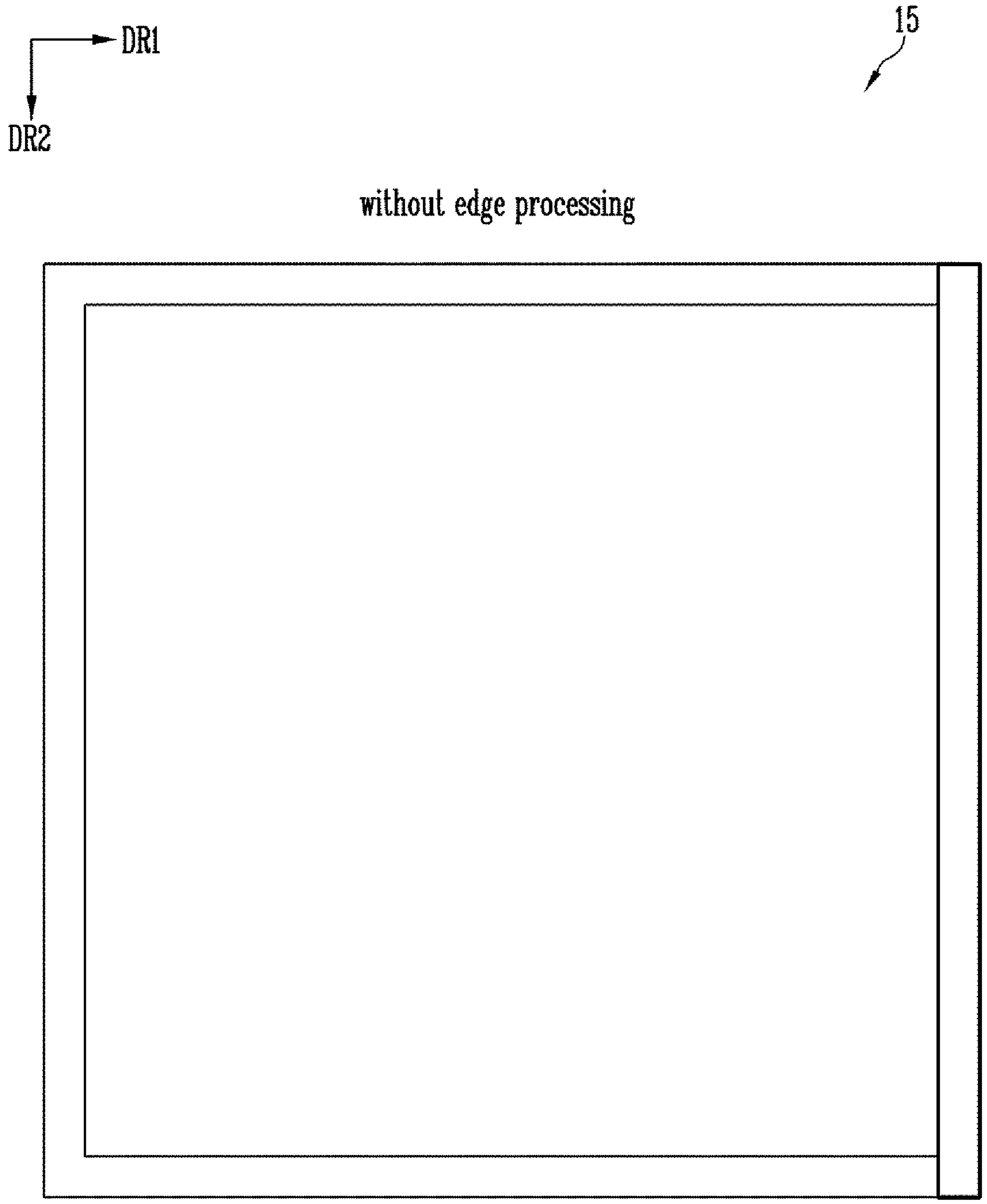
FIG. 10 is a diagram illustrating the pixel unit of FIG. 9, in which an edge processing has not been performed.

FIG. 10 is a diagram illustrating the pixel unit of FIG. 9 when edge processing is not performed, while the edges of the pixel unit are indicated in white.

As used herein, the term "edge processing" refers to processing for decreasing the output grayscale values of outermost pixels or decreasing the luminance values of the outermost pixels through additional methods.

When the left side edge of the pixel unit 15 is suitably mixed with the first color, the second color, and the third color, the left side edge may be indicated in white.

In this case, however, a tinge of the second color may occur in the right side edge of the pixel unit 15. For example, when a rendering filter [0.5 0.5 0] is applied to the third dot DT3, there is no method capable of displaying the input grayscale value of the first color provided to the third dot DT3. That is, the input grayscale value of the first color provided to the third dot DT3 may be lost. Further, when the rendering filter [0.5 0.5 0] is applied to the fifth dot DT5, there is no method capable of displaying the input grayscale value of the third color provided to the fifth dot DT5. That is, the input grayscale value of the third color provided to the fifth dot DT5 may be lost. As such, a tinge of the second color may occur relatively strongly in the right side edge of the pixel unit 15.

Figure 11:
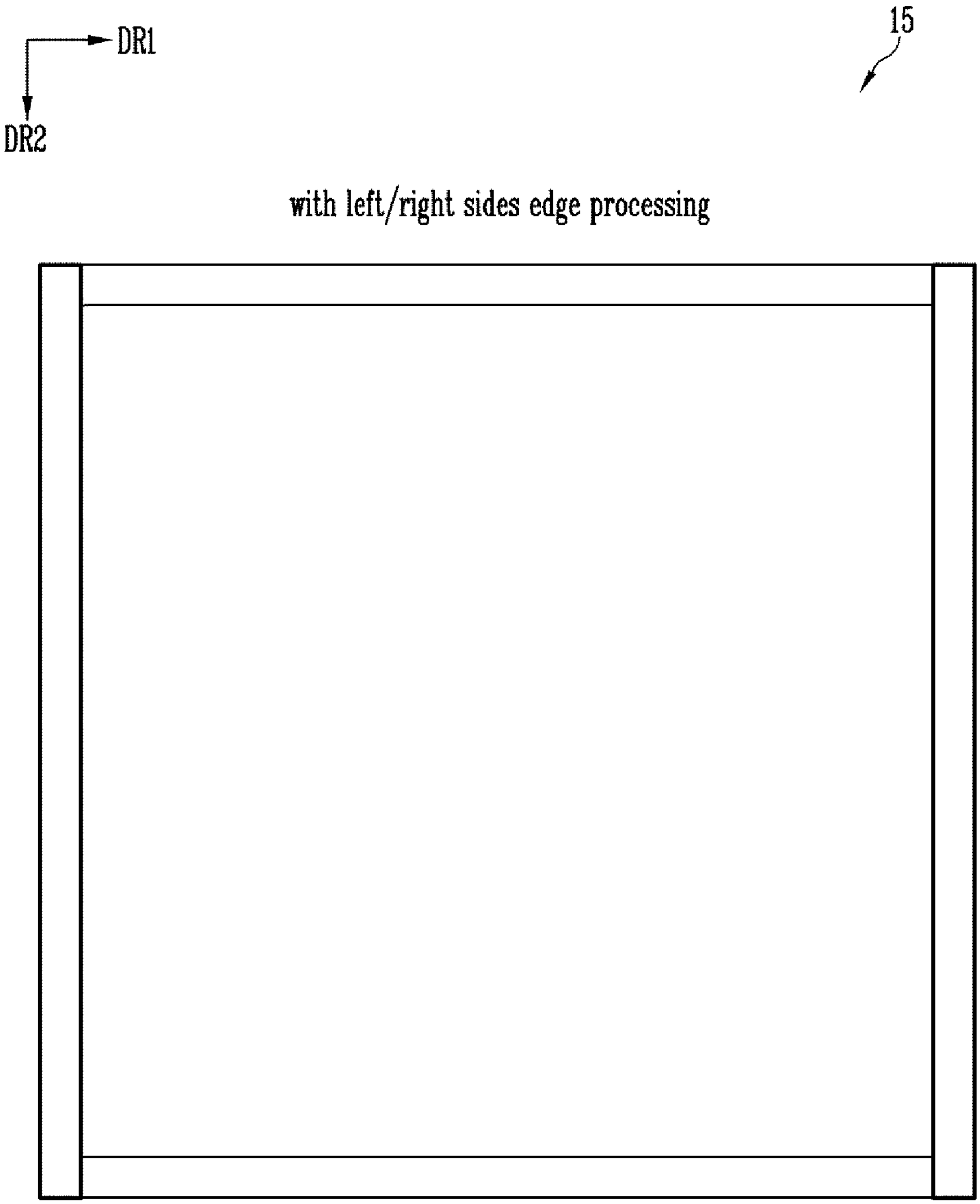
FIG. 11 is a diagram illustrating the pixel unit of FIG. 9, in which left/right side edge processing have been performed.

FIG. 11 is a diagram illustrating the pixel unit of FIG. 9 when left/right side edge processing have been performed, while the edges of the pixel unit are indicated in white.

The timing controller 11 may process the right side edge of the pixel unit 15, so that the luminance of the third dedicated pixel B3 is decreased while the luminance of the third shared pixel C3 in the third dot DT3 is maintained. Similarly, the timing controller 11 may process the right side edge of the pixel unit 15, so that the luminance of the fifth dedicated pixel B5 is decreased while the luminance of the fifth shared pixel A5 in the fifth dot DT5 is maintained. Accordingly, at the right side edge of FIG. 11, a tinge of the second color may be alleviated (or weakened) as compared to the case of FIG. 10.

Meanwhile, when only the luminance at the right side edge of the pixel unit 15 is decreased, the difference in luminance between the left and right side edges of the pixel unit 15 may occur. As such, the luminance at the left side edge of the pixel unit 15 may also need to be decreased. Accordingly, the timing controller 11 may decrease the luminance of the first shared pixel A1, while maintaining the luminance of the first dedicated pixel B1 in the first dot DT1. Similarly, the timing controller 11 may decrease the luminance of the fourth shared pixel C4, while maintaining the luminance of the fourth dedicated pixel B4 in the fourth dot DT4. In this case, a weak tinge of the second color may additionally occur at the left side edge of the pixel unit 15 shown in FIG. 11.

Figure 12:
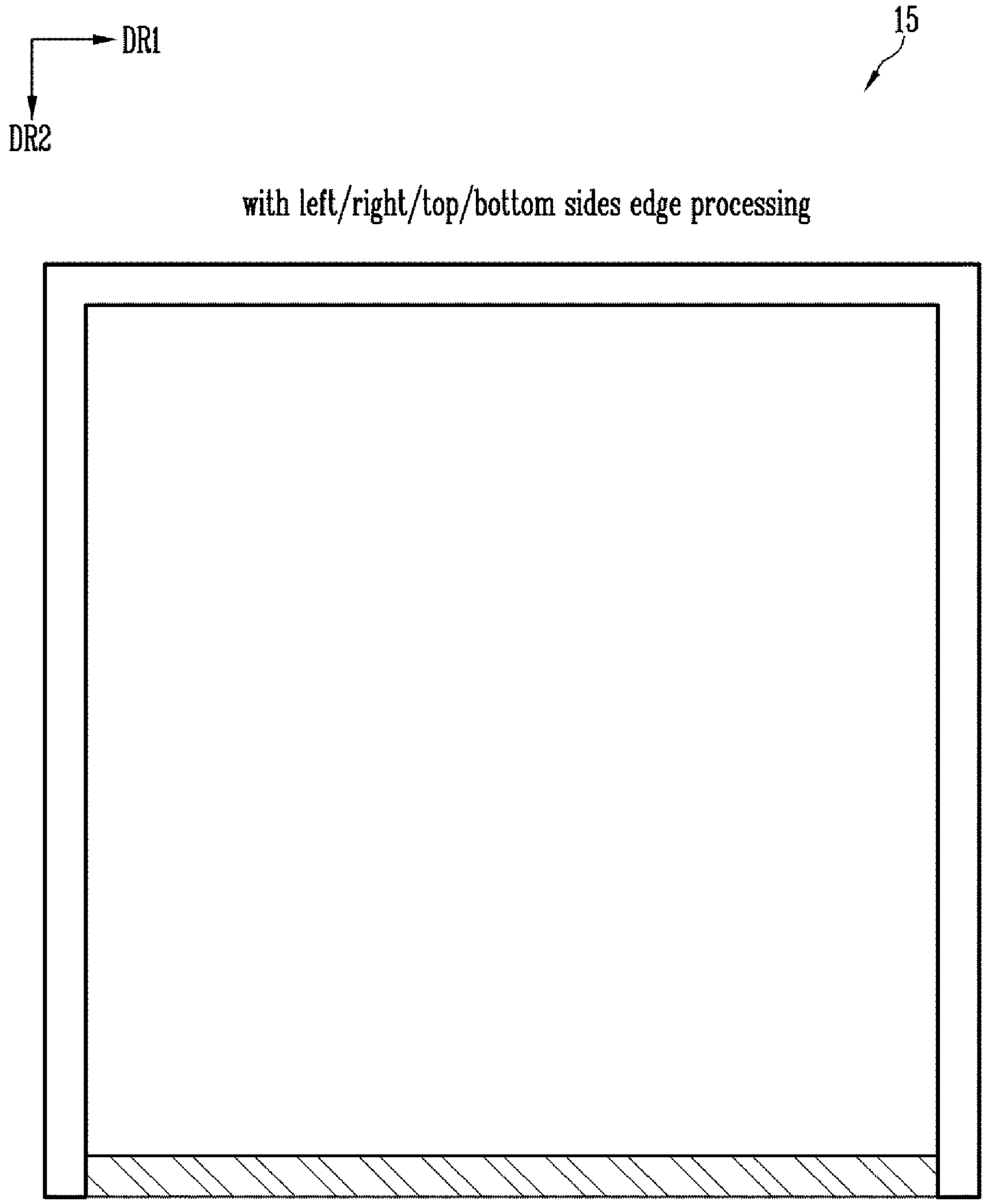
FIG. 12 is a diagram illustrating the pixel unit of FIG. 9, in which is left/right/top/bottom side edge processing have been performed.

FIG. 12 is a diagram illustrating the pixel unit of FIG. 9 when left/right/top/bottom side edge processing have been performed, while the edges of the pixel unit are indicated in white.

FIG. 12 illustrates a case where top/bottom side edge processing is further performed on the pixel unit 15 in addition to the left/right side edge processing illustrated with reference to FIG. 11. Since the luminance of each of the first shared pixel A1, the second shared pixel C2, and the third shared pixel C3 is decreased at the top side edge, a weak tinge in the second color may additionally occur in the top side edge of the pixel unit 15. In addition, since the luminance of each of the dedicated pixels B, B4, and B5 is decreased at the bottom side edge, a weak tinge in a combination of the first color and the third color may occur in the bottom side edge of the pixel unit 15.

Figure 13:
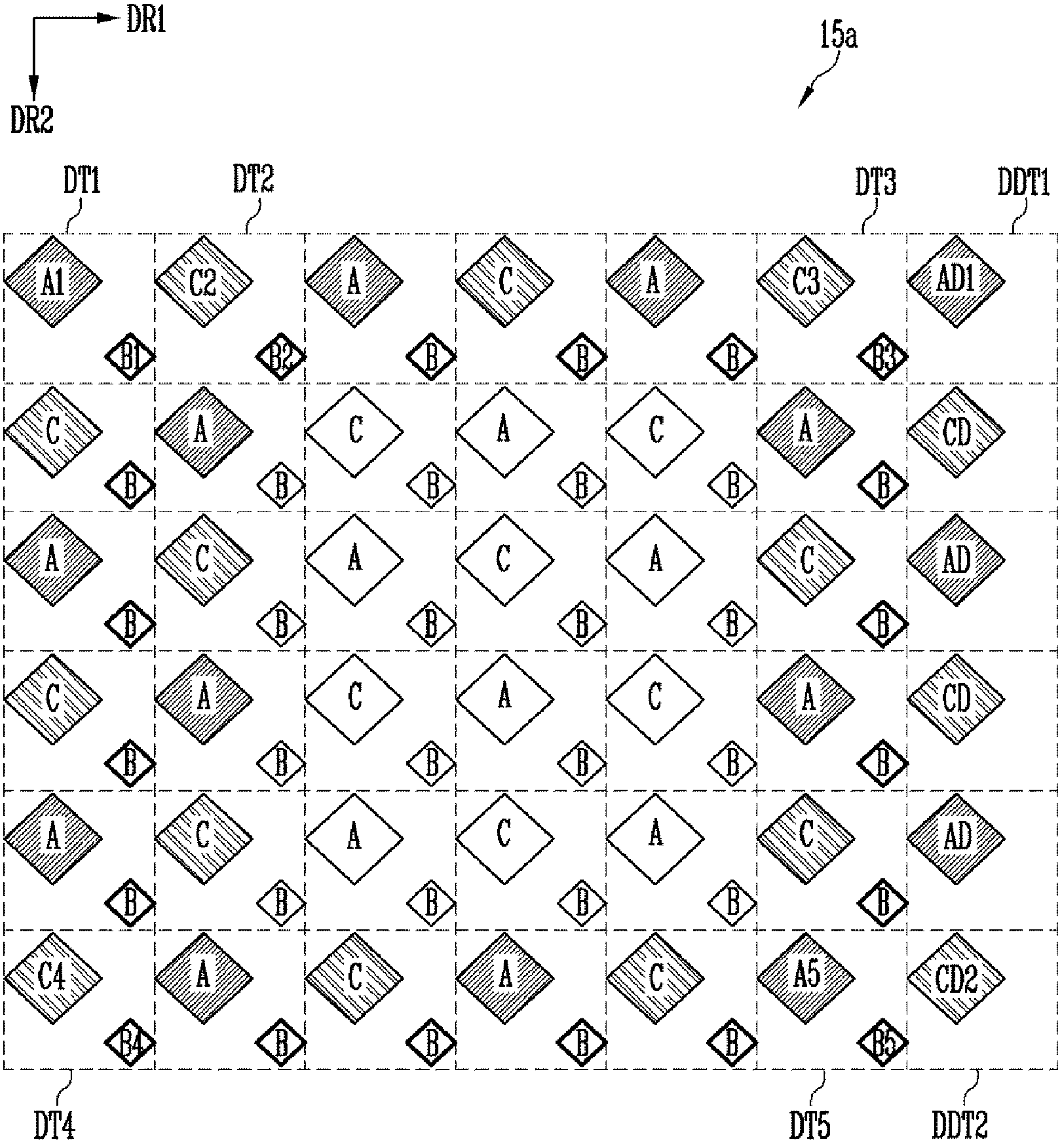
FIG. 13 is a diagram illustrating the structure of a pixel unit and a rendering method according to an exemplary embodiment.

FIG. 13 is a diagram illustrating the structure of a pixel unit and a rendering method according to an exemplary embodiment.

Referring to FIG. 13, a pixel unit 15*a* according to an exemplary embodiment has a structure, in which dummy dots DDT1 and DDT2 are added to the right side edge of the pixel unit 15 of FIG. 9. Since the pixel unit 15*a* of the illustrated exemplary embodiment is substantially similar to the pixel unit 15 described above, other than the dummy dots DDT1 and DDT2, repeated descriptions of substantially the same elements will be omitted to avoid redundancy. Each of the dummy dots DDT1 and DDT2 does not include second color pixels.

The first dummy dot DDT1 may be disposed closest to the third dot DT3 in a first direction DR1, and may include a first dummy pixel AD1. The first dummy pixel AD1 may be the outermost pixel in the first direction DR1 with respect to the first dot DT1.

The second dummy dot DDT2 may be disposed closest to the fifth dot DT5 in the first direction DR1, disposed in the second direction DR2 from the first dummy dot DDT1, and may include a second dummy pixel CD2. The second dummy pixel CD2 may be the outermost pixel in the first direction DR1 with respect to the fourth dot DT4.

One or more dummy dots may be interposed between the first dummy dot DDT1 and the second dummy dot DDT2. The colors of adjacent dummy pixels may be different from each other.

A first shared pixel A1 and a second shared pixel C2 may be pixels of different colors, and a first dedicated pixel B1, a second dedicated pixel B2, and a third dedicated pixel B3 may be pixels of the same color. A third shared pixel C3 and the first dummy pixel AD1 may be pixels of different colors. A fifth shared pixel A5 and the second dummy pixel CD2 may be pixels of different colors.

The second dummy pixel CD2 may be the outermost pixel in the second direction DR2 with respect to the first dummy dot DDT1. A fourth dedicated pixel B4 may be the outermost pixel in the second direction DR2 with respect to the first dot DT1.

The light-emitting area of the first dummy pixel AD1 may be substantially the same as that of the first shared pixel A1. The light-emitting area of the second dummy pixel CD2 may be substantially the same as that of a fourth shared pixel C4.

When a rendering filter [0.5 0.5 0], for example, is applied to the pixel unit 15*a*, the renderer 16 may generate an output grayscale value of the second shared pixel C2 using the input grayscale values of the same color (e.g., the third color) in the first dot DT1 and the second dot DT2. In this case, the proportion (e.g., ratio) of the input grayscale value of the first dot DT1 applied to the output grayscale value of the second shared pixel C2 may be 0.5, and the proportion of the input grayscale value of the second dot DT2 applied thereto may be 0.5.

Also, the renderer 16 may generate an output grayscale value of the first dummy pixel AD1 using the input grayscale value of the third dot DT3. In this case, the proportion of the input grayscale value of the third dot DT3 applied to the output grayscale value of the first dummy pixel AD1 may be 0.5, and the proportion of the input grayscale value of the first dummy dot DDT1 applied thereto may be 0.5. Since an image frame does not include the input grayscale value of the first dummy dot DDT1, the output grayscale value of the first dummy pixel AD1 may be influenced only by the input grayscale value of the third dot DT3.

More particularly, the proportion of the input grayscale value of the third dot DT3 applied to the output grayscale value of the first dummy pixel AD1 may be the same as the proportion of the input grayscale value of the first dot DT1 applied to the output grayscale value of the second shared pixel C2. That is, since the pixel unit 15*a* may use the same rendering filter [0.5 0.5 0] as the pixel unit 15 without change, even if the display device 10 employs the pixel unit 15*a*, the renderer 16 may not need to be reorganized.

In this manner, the input grayscale value of the first color, provided to the third dot DT3, may be displayed by the first dummy pixel AD1. Also, the input grayscale value of the third color, provided to the fifth dot DT5, may be displayed by the second dummy pixel CD2. As such, even if edge processing is not performed in the pixel unit 15*a* according to the illustrated exemplary embodiment, a tinge of color, such as that shown in FIG. 10, may not occur. As such, since edge processing itself is not needed, a color tinge, such as that shown in FIGS. 11 and 12, may not occur in the pixel unit 15*a* according to the illustrated exemplary embodiment.

Figure 14:
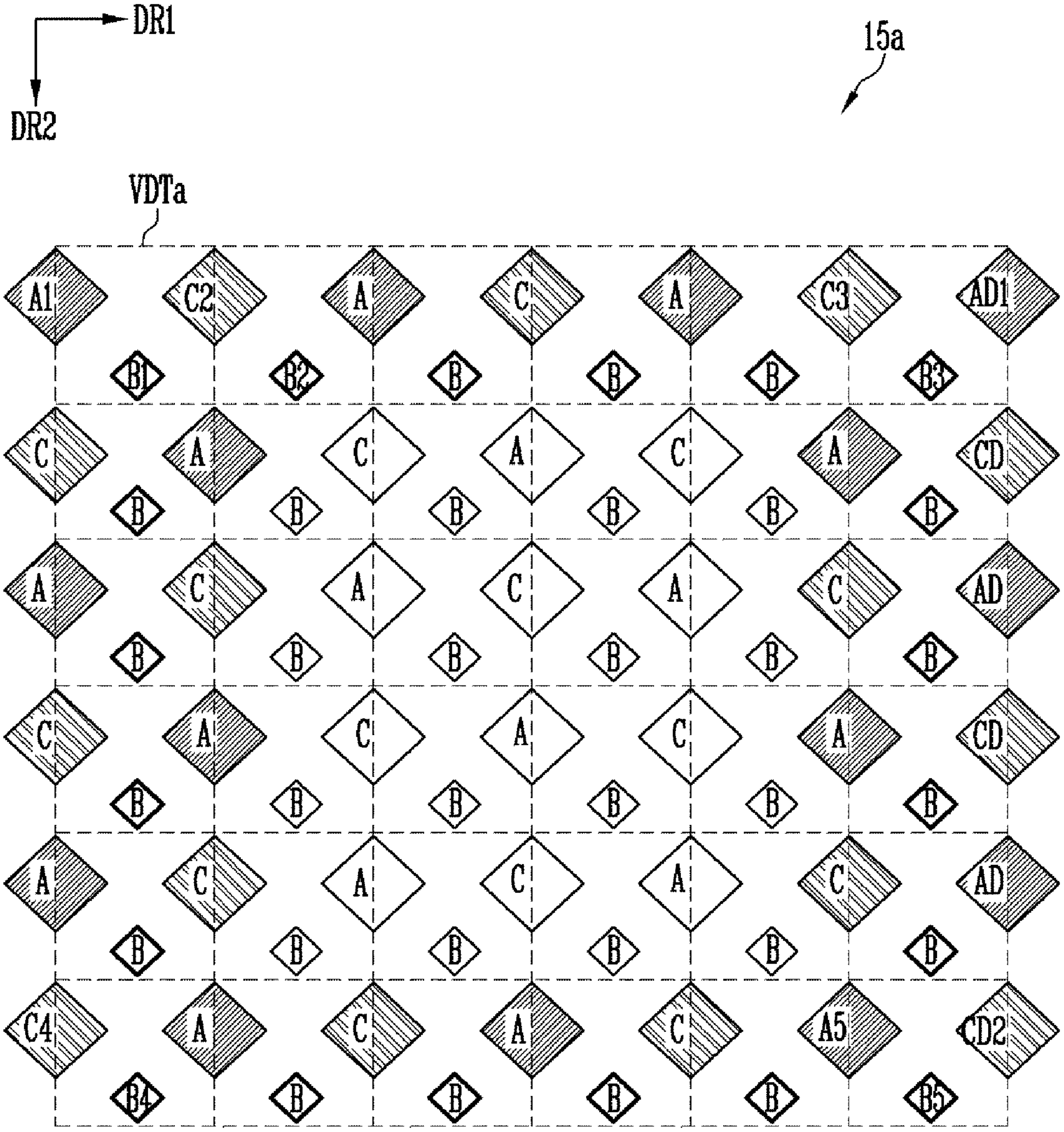
FIG. 14 is a diagram illustrating a shape, in which the pixel unit of FIG. 13 is perceived by a user.

FIG. 14 is a diagram illustrating a shape, in which the pixel unit of FIG. 13 is perceived by a user.

Referring to FIG. 14, virtual dots VDTa may be defined by partitioning the pixel unit 15*a* shown in FIG. 14, which may be dots that can actually be perceived (or be seen) by the user. The respective virtual dots VDTa may be capable of representing fine patterns with the same image quality based on dedicated pixels B, B1, B2, B3, B4, and B5 of a second color.

Further, the thicknesses of left/right side edges may be uniformly indicated by the virtual dots VDTa.

Figure 15:
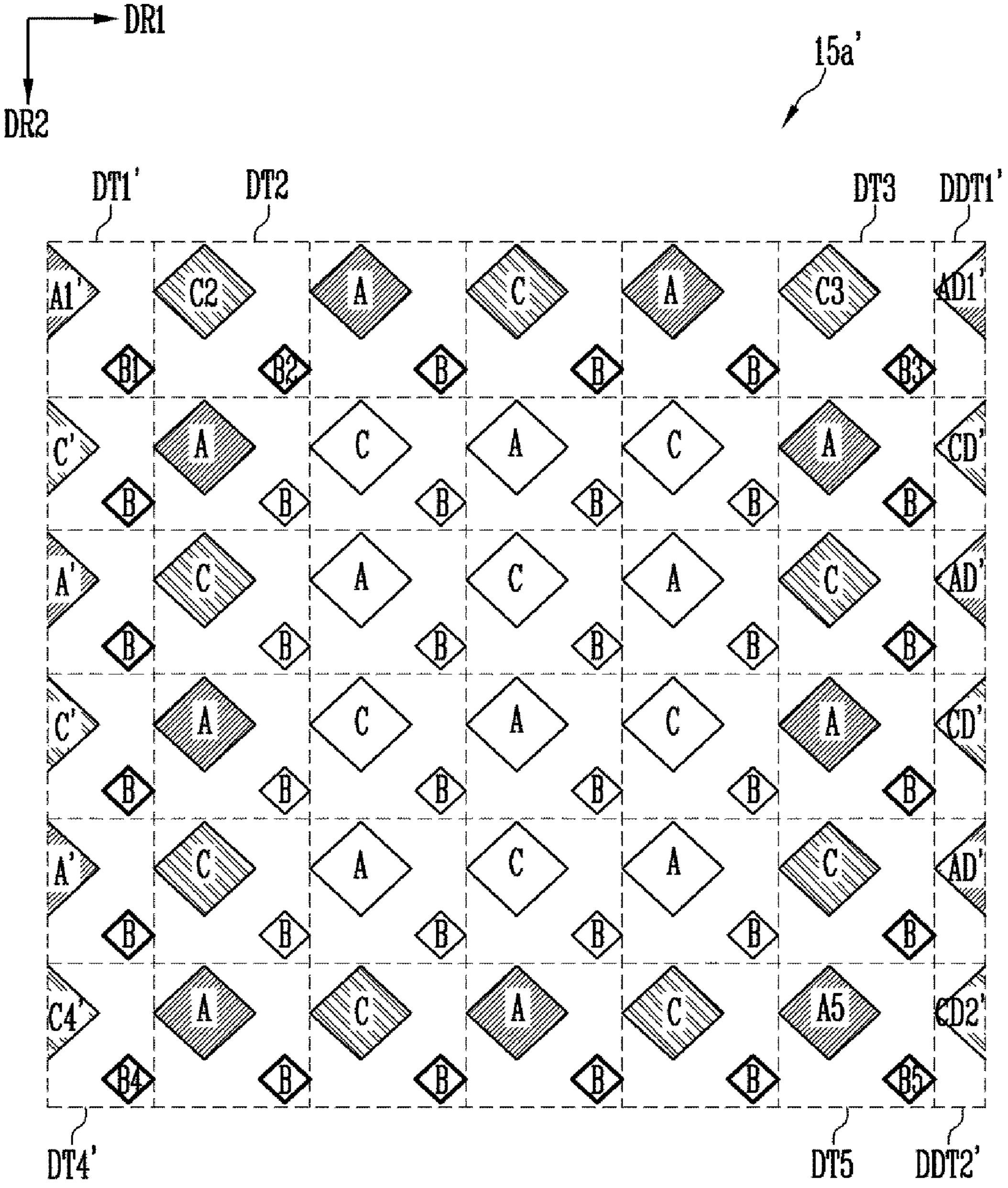
FIG. 15 is a diagram illustrating the structure of a pixel unit and a rendering method according to an exemplary embodiment.

FIG. 15 is a diagram illustrating the structure of a pixel unit and a rendering method according to an exemplary embodiment.

Referring to FIG. 15, pixels and dummy pixels in a pixel unit 15*a'* may be arranged at the same locations as those of the pixel unit 15*a* of FIG. 13.

In the pixel unit 15*a'* according to the illustrated exemplary, however, light-emitting areas of pixels A', A1', C', and C4' and dummy pixels AD', AD1', CD', and CD2' that are disposed at the left/right side edges of the pixel unit 15*a'* may be smaller than those of the shared pixels A and C, which are not disposed at edges.

For example, the light-emitting area of the first shared pixel A1' may be smaller than that of a second shared pixel C2. Also, the light-emitting area of the first dummy pixel AD1' may be smaller than that of a third shared pixel C3. For example, the light-emitting area of the first shared pixel A1' may be about half of that of the second shared pixel C2. Also, the light-emitting area of the first dummy pixel AD1' may be about half of that of the third shared pixel C3.

When a rendering filter [0.5 0.5 0], for example, may be equally applied to the pixel unit 15*a'*, the same driving currents as those of the pixel unit 15*a* may be supplied to the pixels A', A1', C', and C4' and the dummy pixels AD', AD1', CD', and CD2', which are disposed at left/right side edges. In this case, an increase of luminance per unit area in each of the pixels A', A1', C', and C4' and the dummy pixels AD', AD1', CD', and CD2' that are disposed at the left/right side edges of the pixel unit 15*a'* may be offset by a decreased luminance from the smaller light-emitting areas thereof. As such, even if the rendering filter [0.5 0.5 0], for example, is equally applied to the pixel unit 15*a'*, the pixel unit 15*a'* according to the illustrated exemplary embodiment may display similarly as that in the pixel unit 15*a*.

In some exemplary embodiments, when dots DT2, DT3, and DT5 located in the remaining area other than the edges of the pixel unit 15*a'* are designated as target dots, the rendering filter [0.5 0.5 0] may be applied. However, when dots DT1' and DT4' and dummy dots DDT1' and DDT2' that are located at the left/right side edges are designated as target dots, a rendering filter [1 1 0] may be applied. More particularly, the proportion (e.g., K1=1) of the input grayscale value of the third dot DT3 applied to the output grayscale value of the first dummy pixel AD1' may be greater than the proportion (e.g., K1=0.5) of the input grayscale value of the first dot DT1' applied to the output grayscale value of the second shared pixel C2. In this case, the output of an amplifier, which applies data voltages to data lines coupled to the dummy pixels AD', AD1', CD', and CD2', may be less than that of an amplifier applying a data voltage to a data line coupled to the second shared pixel C2 (e.g., ½). The amplifiers may be included in a buffer unit of the data driver 12.

The above description may be equally applied to the shared pixels A', A1', C' and C4' at the left side edges. As such, the pixel unit 15*a'* according to the illustrated exemplary embodiment may prevent the degradation of the pixels and the dummy pixels at the left/right side edges from overcurrent.

Figure 16:
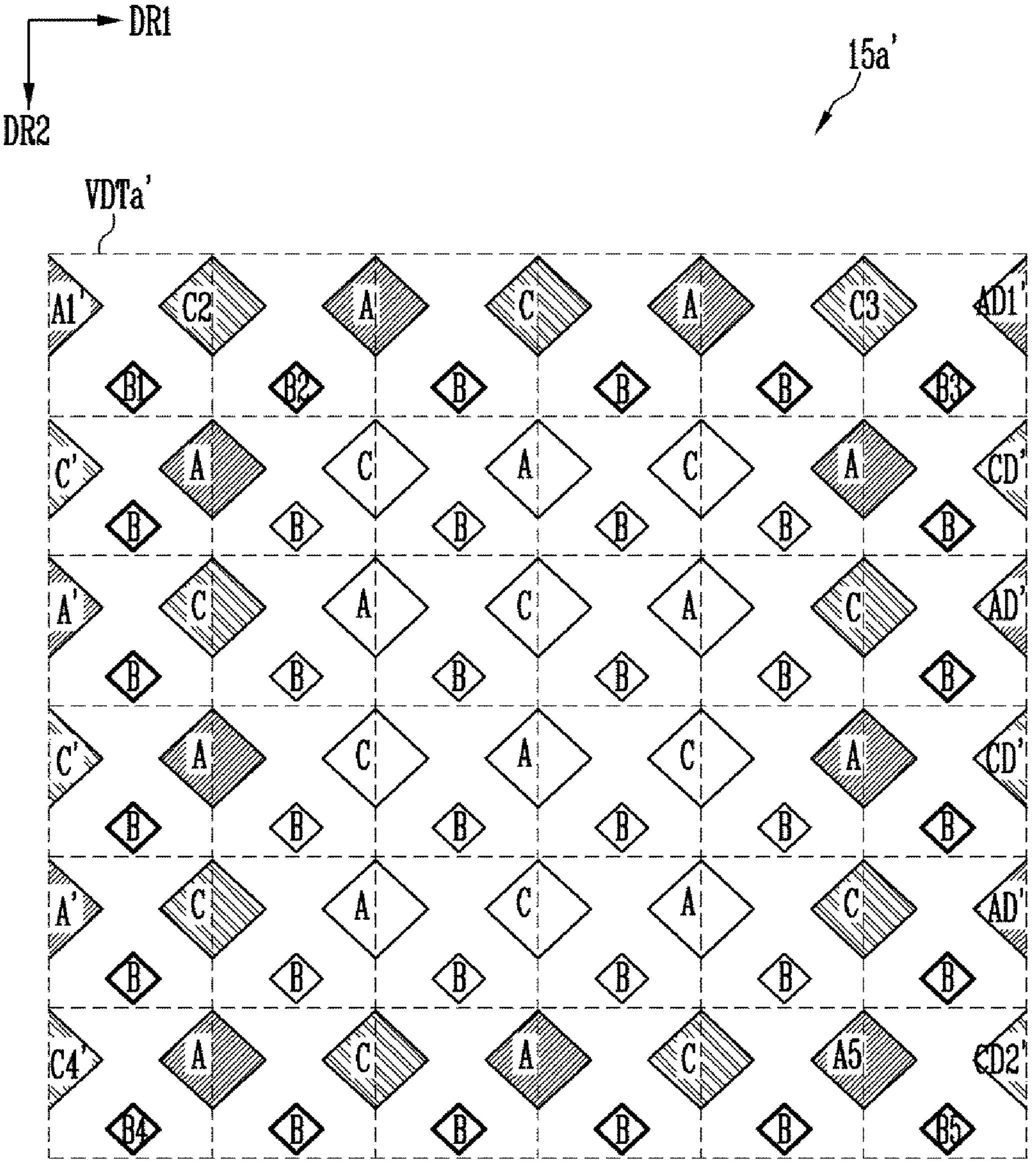
FIG. 16 is a diagram illustrating a shape, in which the pixel unit of FIG. 15 is perceived by a user.

FIG. 16 is a diagram illustrating a shape, in which the pixel unit of FIG. 15 is perceived by a user.

Referring to FIG. 16, virtual dots VDTa' may be defined by partitioning the pixel unit 15*a'* of FIG. 16, which may be dots that can actually be perceived by the user. The respective virtual dots VDTa' may be capable of representing fine patterns with the same image quality based on dedicated pixels B, B1, B2, B3, B4, and B5 of a second color.

Also, the areas of respective virtual dots VDTa' of the pixel unit 15*a'* may be substantially the same each other. As such, the pixel unit 15*a'* according to the illustrated exemplary embodiment may represent fine patterns precisely.

Figure 17:
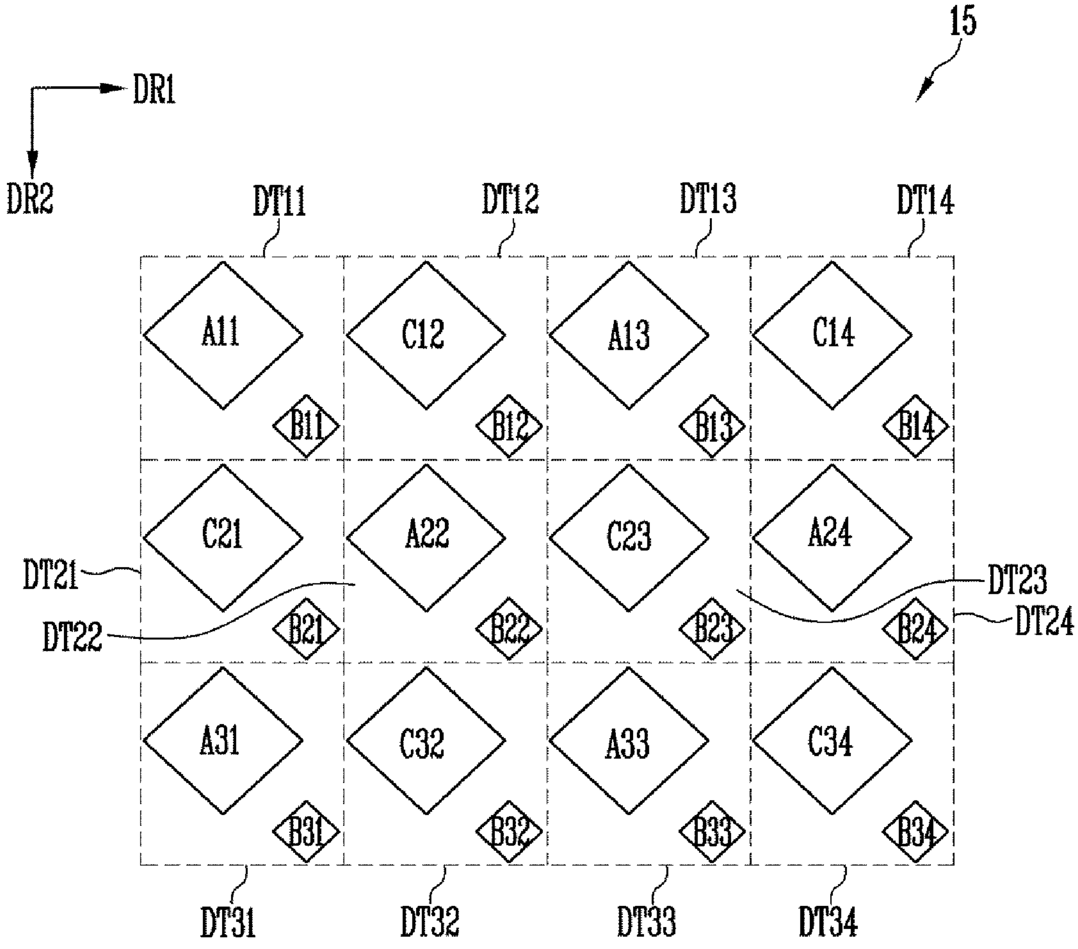
FIG. 17 is a diagram for illustrating a rendering calculation unit according to an exemplary embodiment.

FIG. 17 is a diagram for illustrating a rendering calculation unit according to an exemplary embodiment.

A rendering calculation unit 162 may use the rendering filter, such as that shown in the following Equation (2):

$$RF2 = \begin{bmatrix} L1 & L2 & L3 \\ L4 & L5 & L6 \\ L7 & L8 & L9 \end{bmatrix} \quad \text{Equation (2)}$$

Here, RF2 may be a rendering filter, L5 may be a coefficient to be multiplied by the gamma grayscale value of a target dot, L1 may be a coefficient to be multiplied by the gamma grayscale value of a top-left dot, L2 may be a coefficient to be multiplied by the gamma grayscale value of a top dot, L3 may be a coefficient to be multiplied by the gamma grayscale value of a top-right dot, L4 may be a coefficient to be multiplied by the gamma grayscale value of a left dot, L6 may be a coefficient to be multiplied by the gamma grayscale value of a right dot, L7 may be a coefficient to be multiplied by the gamma grayscale value of a bottom-left dot, L8 may be a coefficient to be multiplied by the gamma grayscale value of a bottom dot, and L9 may be a coefficient to be multiplied by the gamma grayscale value of a bottom-right dot.

For example, L1=0, L2=0.125, L3=0, L4=0.125, L5=0.5, L6=0.125, L7=0, L8=0.125, and L9=0 may be satisfied. However, in order to prevent a blurring issue described above, L1=0.25, L2=0.25, L3=0, L4=0.25, L5=0.25, L6=0, L7=0, L8=0, and L9=0 may be satisfied. However, the inventive concepts are not limited thereto, and L1 to L9 may be set to various values, as long as a relationship of L1+L2+L3+L4+L5+L6+L7+L8+L9=1 is satisfied.

A procedure for applying a rendering filter is similar to those illustrated above with reference to FIG. 7, and thus, repeated descriptions thereof will be omitted.

Figure 18:
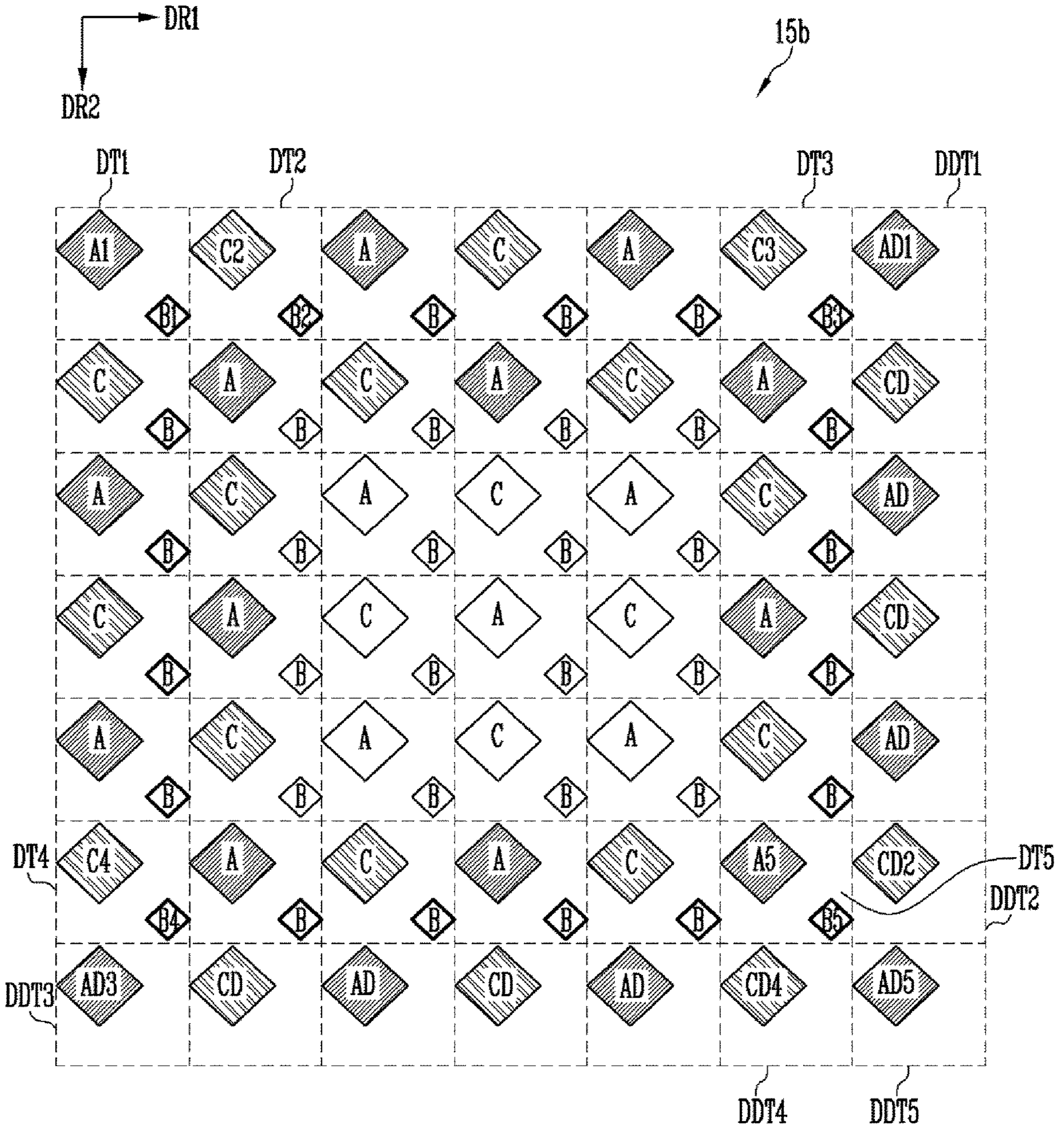
FIG. 18 is a diagram illustrating the structure of a pixel unit and a rendering method according to an exemplary embodiment.

FIG. 18 is a diagram illustrating the structure of a pixel unit and a rendering method according to an exemplary embodiment.

Referring to FIG. 18, a pixel unit 15*b* according to the illustrated exemplary embodiment includes dummy dots DDT3, DDT4, and DDT5 added to the bottom side edge of the pixel unit 15*a* of FIG. 13. Since the pixel unit 15*b* according to the illustrated exemplary embodiment is substantially the same as the pixel unit 15*a* of FIG. 13, other than the dummy dots DDT3, DDT4, and DDT5, repeated descriptions of substantially similar elements will be omitted to avoid redundancy. Each of the dummy dots DDT3, DDT4, and DDT5 may not include second color pixels.

The third dummy dot DDT3 may be disposed closest to the fourth dot DT4 in a second direction DR2, and may include a third dummy pixel AD3. The fourth shared pixel C4 and the third dummy pixel AD3 may be pixels of different colors.

The fourth dummy dot DDT4 may be disposed in the first direction DR1 from the third dummy dot DDT3, disposed closest to the fifth dot DT5 in the second direction DR2, and may include a fourth dummy pixel CD4. The fifth shared pixel A5 and the fourth dummy pixel CD4 may be pixels of different colors.

The fifth dummy dot DDT5 may be disposed closest to the fourth dummy dot DDT4 in the first direction DR1, disposed closest to the second dummy dot DDT2 in the second direction DR2, and may include a fifth dummy pixel AD5. The fourth dummy pixel CD4 and the second dummy pixel CD2 may be pixels of the same color. The fourth dummy pixel CD4 and the fifth dummy pixel AD5 may be pixels of different colors.

The third dummy pixel AD3 may be the outermost pixel in the second direction DR2 with respect to the first dot DT1. The fourth dummy pixel CD4 may be the outermost pixel in the second direction DR2 with respect to the third dot DT3. The fifth dummy pixel AD5 may be the outermost pixel in the second direction DR2 with respect to the first dummy dot DDT1, and may be the outermost pixel in the first direction DR1 with respect to the third dummy dot DDT3.

According to an exemplary embodiment, the loss of input grayscale values that may occur when the rendering filter, such as that shown in Equation (2), is applied to the pixel unit 15*b* may be prevented, and thus, a color tinge may be prevented. Since the configuration and the operation of the pixel unit 15*b* according to the illustrated exemplary embodiment are substantially similar to those of the pixel unit 15*a* illustrated with reference to FIG. 13, repeated descriptions thereof will be omitted.

Figure 19:
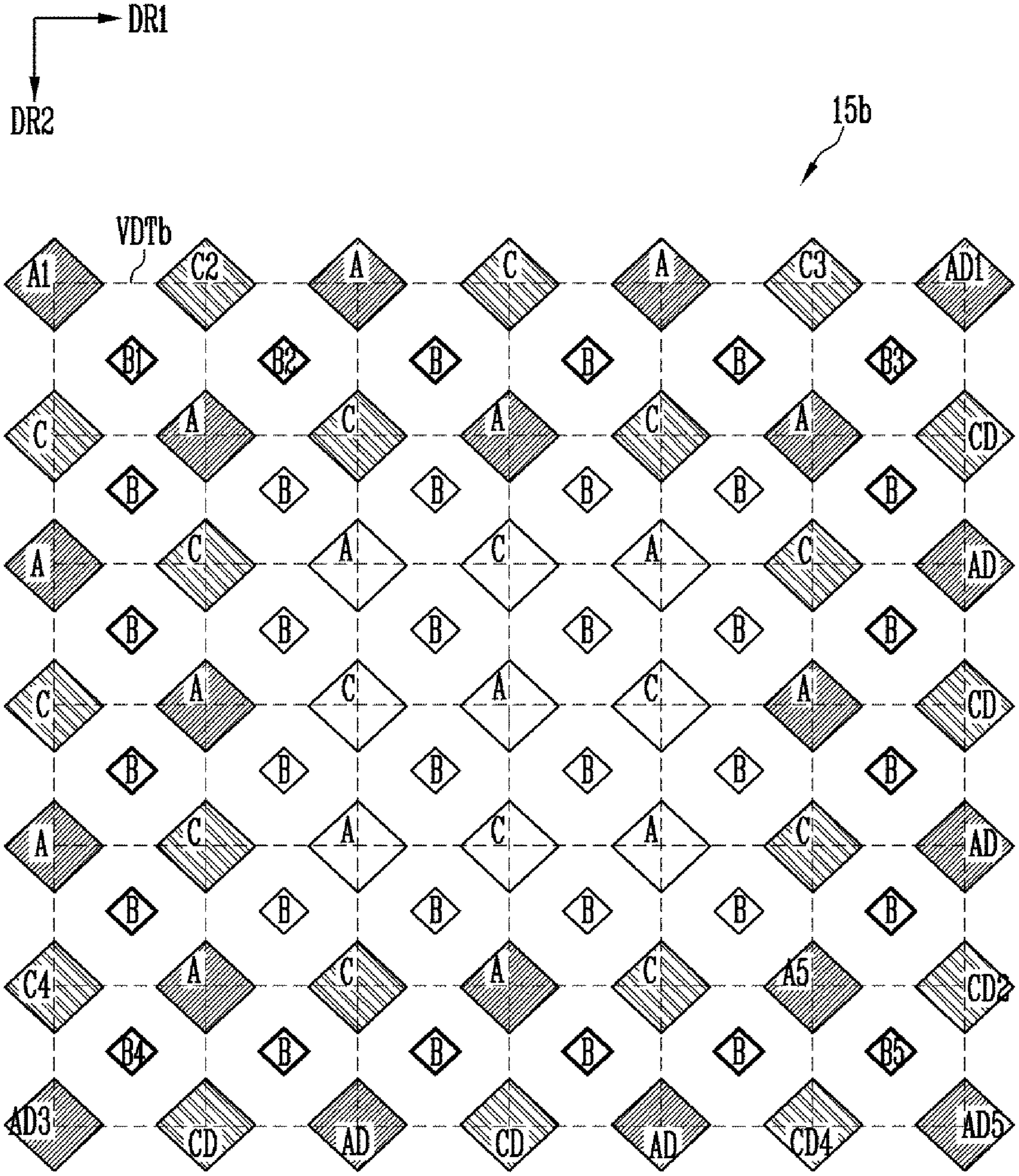
FIG. 19 is a diagram illustrating a shape, in which the pixel unit of FIG. 18 is perceived by a user.

FIG. 19 is a diagram illustrating a shape, in which the pixel unit of FIG. 18 is perceived by a user.

Referring to FIG. 19, virtual dots VDTb may be defined by partitioning the pixel unit 15*b* of FIG. 19, which may be dots that can actually be perceived by the user. The respective virtual dots VDTb may be capable of representing fine patterns with the same image quality based on dedicated pixels B, B1, B2, B3, B4, and B5 of a second color.

Also, the thicknesses of top/bottom/left/right side edges of the pixel unit 15*b* may be uniformly indicated.

Figure 20:
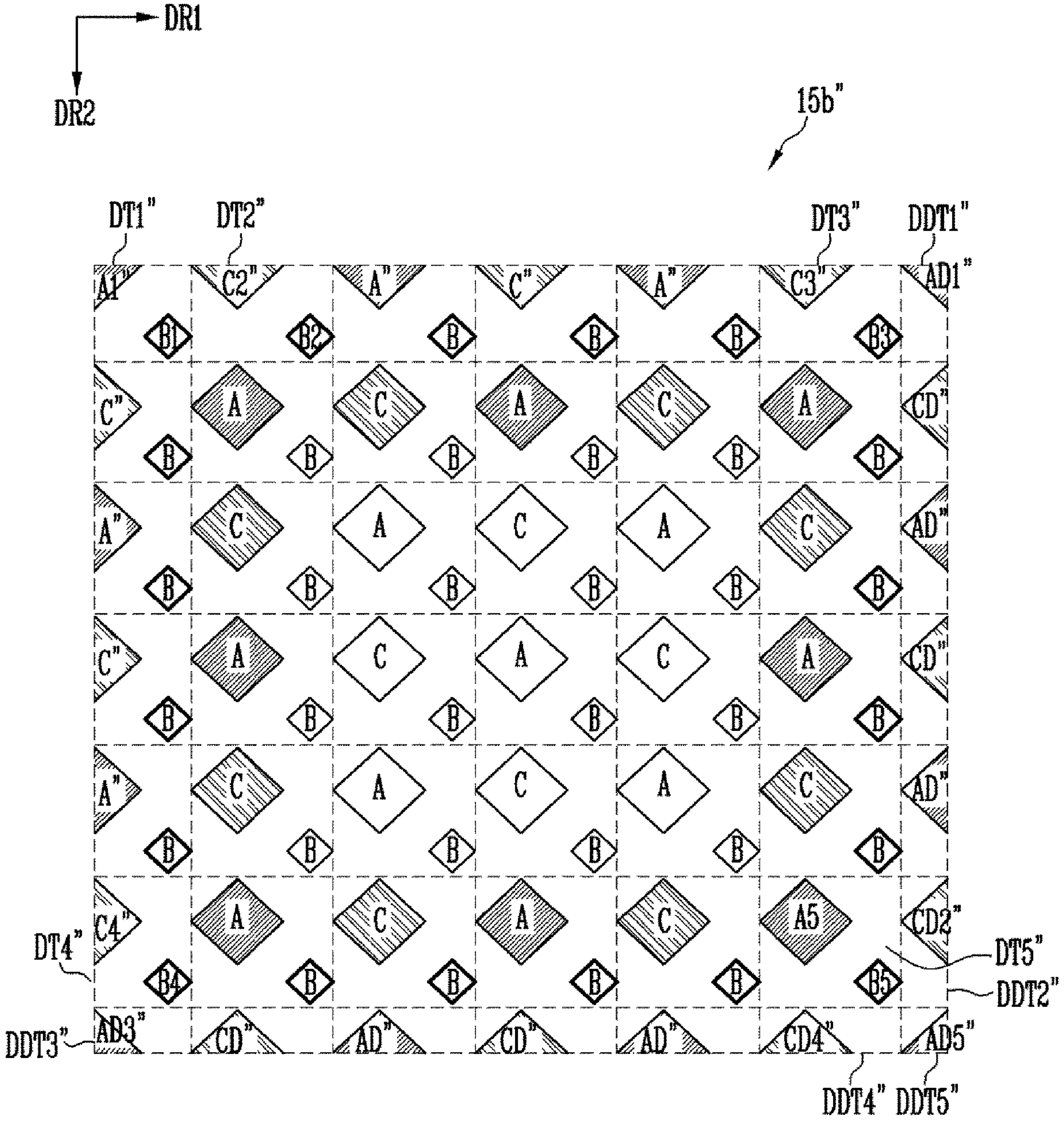
FIG. 20 is a diagram illustrating the structure of a pixel unit and a rendering method according to an exemplary embodiment.

FIG. 20 is a diagram illustrating the structure of a pixel unit and a rendering method according to an exemplary embodiment.

Referring to FIG. 20, the pixels and dummy pixels of a pixel unit 15*b*" according to the illustrated exemplary embodiment may be arranged at substantially the same locations to those of the pixel unit 15*b* of FIG. 18.

In the pixel unit 15*b*", however, light-emitting areas of pixels A", C", C2", C3", and C4" and dummy pixels AD", CD", CD2", and CD4" that are disposed at the top/bottom/left/right side edges of the pixel unit 15*b*" may be smaller than those of the shared pixels A and C that are not disposed at the edges. Also, light-emitting areas of a pixel A1" and dummy pixels AD1", AD3", and AD5" that are located at the corners of the pixel unit 15*b*" of FIG. 20 may be smaller than those of the pixels A", C", C2", C3", and C4" and the dummy pixels AD", CD", CD2", and CD4" that are disposed at the top/bottom/left/right side edges.

For example, the light-emitting area of a fifth shared pixel A5 may be larger than that of the second dummy pixel CDT, and the light-emitting area of the second dummy pixel CD2" may be larger than that of the fifth dummy pixel AD5".

A rendering filter identical to or different from that of the pixel unit 15*b* may be applied to the pixel unit 15*b*". As such, related descriptions thereof will be omitted.

Figure 21:
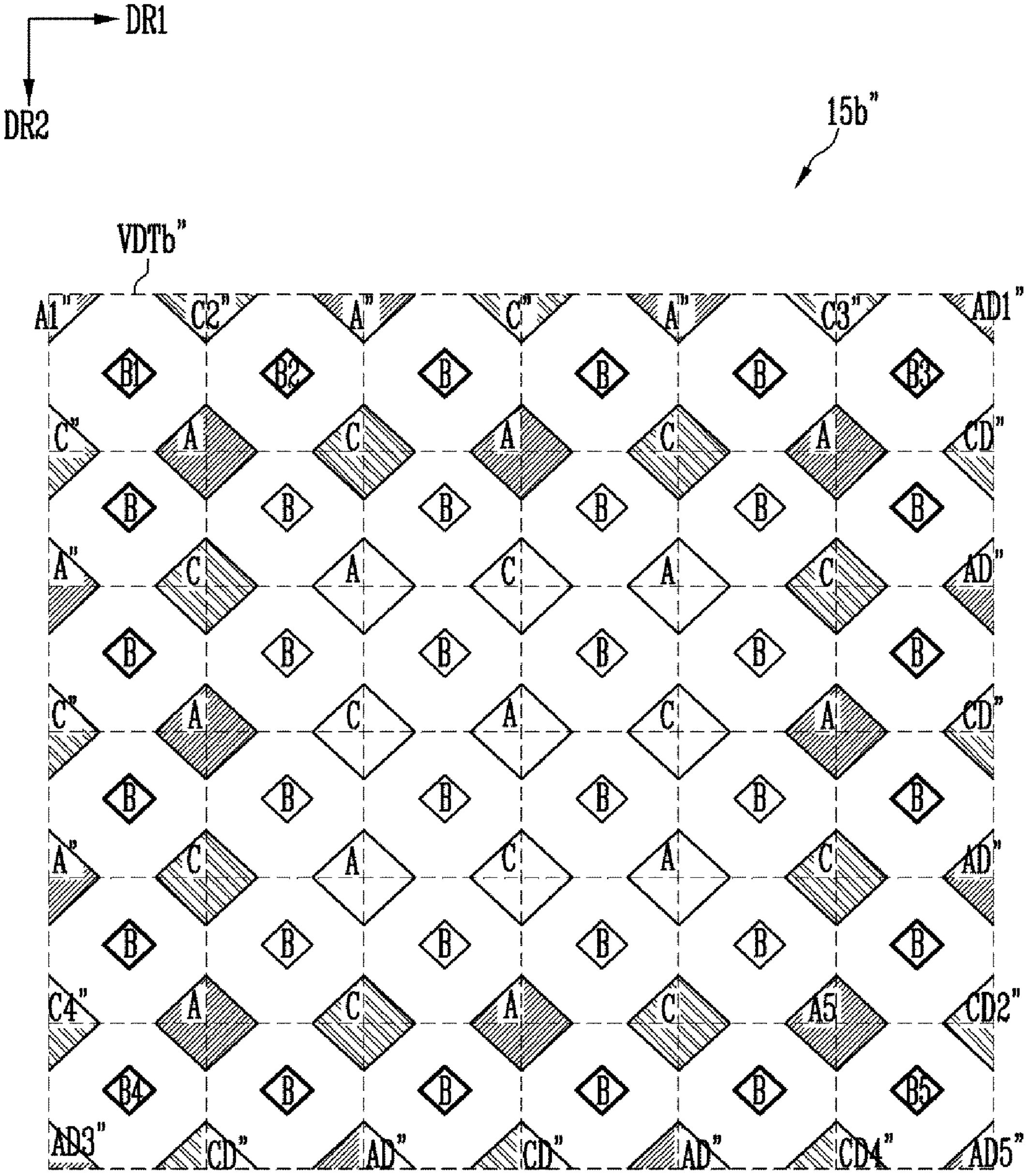
FIG. 21 is a diagram illustrating a shape, in which the pixel unit of FIG. 20 is perceived by a user.

FIG. 21 is a diagram illustrating a shape, in which the pixel unit of FIG. 20 is perceived by a user.

Referring to FIG. 21, virtual dots VDTb" may be defined by partitioning the pixel unit 15*b*" of FIG. 21, which may be dots that can actually be perceived by the user. The respective virtual dots VDTb" may be capable of representing fine patterns with the same image quality based on dedicated pixels B, B1, B2, B3, B4, and B5 of a second color.

Also, the areas of respective virtual dots VDTb" of the pixel unit 15*b*" are substantially the same as each other, the pixel unit 15*b*" according to the illustrated exemplary embodiment may represent fine patterns precisely.

The display device and the method of driving the display device according to the exemplary embodiments may prevent a tinge of color from occurring at the edges of a pixel unit.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising a rectangular pixel unit, the rectangular pixel unit comprising:

a first dot including a first shared pixel and a first dedicated pixel, the first dot disposed at a first edge of the rectangular pixel unit;

a second dot disposed closest to the first dot in a first direction and including a second shared pixel and a second dedicated pixel;

a third dot disposed in the first direction from the second dot and including a third shared pixel and a third dedicated pixel; and a first dummy dot disposed closest to the third dot in the first direction and including a first dummy pixel, the first dummy dot disposed at a second edge of the rectangular pixel unit, wherein:

the first shared pixel and the second shared pixel are configured to emit light having different colors;

the first dedicated pixel, the second dedicated pixel, and the third dedicated pixel are configured to emit light having the same color;

the third shared pixel and the first dummy pixel are configured to emit light having different colors;

a light-emitting area of the first shared pixel is smaller than a light-emitting area of the second shared pixel;

a light-emitting area of the first dummy pixel is smaller than a light-emitting area of the third shared pixel;

the second shared pixel is connected to, among a plurality of data lines, only a single data line;

the first dummy pixel is configured to display an input grayscale value provided to the third dot; and a first proportion of the input grayscale value of the third dot applied to an output grayscale value of the first dummy pixel is greater than a second proportion of an input grayscale value of the first dot applied to an output grayscale value of the second shared pixel.

2. The display device according to claim 1, wherein the first dummy pixel is an outermost pixel in the first direction with respect to the first dot.

3. The display device according to claim 2, wherein the rectangular pixel unit further comprises:

a fourth dot disposed in a second direction from the first dot and including a fourth shared pixel and a fourth dedicated pixel;

a fifth dot disposed in the first direction from the fourth dot and in the second direction from the third dot, the fifth dot including a fifth shared pixel and a fifth dedicated pixel; and a second dummy dot disposed closest to the fifth dot in the first direction and in the second direction from the first dummy dot, the second dummy dot including a second dummy pixel, and wherein the fifth shared pixel and the second dummy pixel are configured to emit light having different colors.

4. The display device according to claim 3, wherein the second dummy pixel is an outermost pixel in the first direction with respect to the fourth dot.

5. The display device according to claim 4, wherein:

the second dummy pixel is an outermost pixel in the second direction with respect to the first dummy dot; and the fourth dedicated pixel is an outermost pixel in the second direction with respect to the first dot.

6. The display device according to claim 5, wherein:

the first dummy dot and the second dummy dot are disposed at the second edge.

7. The display device according to claim 6, wherein:

the first dot and the fourth dot are disposed at the first edge.

8. The display device according to claim 7, wherein:

the first edge and the second edge are forms of straight lines parallel to each other.

9. The display device according to claim 8, wherein:

the first dot, the second dot, the third dot, and the first dummy dot are disposed at a third edge of the rectangular pixel unit.

10. The display device according to claim 9, wherein:

the fourth dot, the fifth dot, and the second dummy dot are disposed at a fourth edge of the rectangular pixel unit.

11. The display device according to claim 10, wherein:

the third edge and the fourth edge are forms of straight lines parallel to each other.

12. The display device according to claim 11, wherein:

the first edge and the third edge are perpendicular to each other; and the second edge and the fourth edge are perpendicular to each other.

13. The display device according to claim 1, wherein:

the light-emitting area of the first shared pixel is a half of the light-emitting area of the second shared pixel; and the light-emitting area of the first dummy pixel is a half of the light-emitting area of the third shared pixel.

14. The display device according to claim 13, wherein:

the light-emitting area of the first shared pixel has a shape symmetric to a shape of the light-emitting area of the first dummy pixel.

15. The display device according to claim 13, wherein:

the light-emitting area of the second shared pixel has a diamond shape.

16. The display device according to claim 15, wherein:

the light-emitting area of the first shared pixel has a half-diamond shape; and the light-emitting area of the first dummy pixel has a half-diamond shape.

17. The display device according to claim 16, wherein:

the light-emitting area of the first shared pixel has a shape symmetric to a shape of the light-emitting area of the first dummy pixel.

18. The display device according to claim 1, wherein:

the first proportion is 1; and the second proportion is 0.5.

19. The display device according to claim 1, wherein a first output of a first amplifier connected to a first data line coupled to the first dummy pixel is less than a second output of a second amplifier connected to a second data line coupled to the second shared pixel.

* * * * *